United States Patent
Mishina et al.

(10) Patent No.: US 8,914,370 B2
(45) Date of Patent: Dec. 16, 2014

(54) GENERATING RULES FOR CLASSIFYING STRUCTURED DOCUMENTS

(75) Inventors: Takuya Mishina, Kanagawa (JP); Toshiro Takase, Kanagawa (JP)

(73) Assignee: International Business Machines Corporation, Armonk, NY (US)

( * ) Notice: Subject to any disclaimer, the term of this patent is extended or adjusted under 35 U.S.C. 154(b) by 0 days.

(21) Appl. No.: 13/274,988

(22) Filed: Oct. 17, 2011

(65) Prior Publication Data

US 2012/0109960 A1    May 3, 2012

(30) Foreign Application Priority Data

Oct. 29, 2010 (JP) .................. 2010-243910

(51) Int. Cl.
*G06F 17/30* (2006.01)

(52) U.S. Cl.
CPC .... *G06F 17/30705* (2013.01); *G06F 17/30923* (2013.01)
USPC ........................................... 707/737

(58) Field of Classification Search
CPC ............................................... G06F 17/30705
USPC .................... 707/703, 795, E17.089
See application file for complete search history.

(56) References Cited

U.S. PATENT DOCUMENTS

| | | | | |
|---|---|---|---|---|
| 7,370,273 B2* | 5/2008 | Beyer et al. | ........... | 707/771 |
| 7,912,846 B2* | 3/2011 | Kawabe et al. | ........... | 707/758 |
| 7,974,984 B2* | 7/2011 | Reuther | ........... | 707/777 |
| 2003/0177118 A1* | 9/2003 | Moon et al. | ........... | 707/5 |
| 2006/0288015 A1* | 12/2006 | Schirripa et al. | ........... | 707/100 |
| 2007/0061713 A1* | 3/2007 | Chidlovskii et al. | ........... | 715/523 |

FOREIGN PATENT DOCUMENTS

| | | |
|---|---|---|
| JP | 2000003366 A | 1/2000 |
| JP | 2001014326 A | 1/2001 |
| JP | 2001191743 A | 7/2001 |
| JP | 2003030227 A | 1/2003 |
| JP | 2003308327 A | 10/2003 |
| JP | 2004118379 A | 4/2004 |
| JP | 2004240231 A | 8/2004 |
| JP | 2005227851 A | 8/2005 |
| JP | 2005250820 A | 9/2005 |
| JP | 2005251175 A | 9/2005 |

(Continued)

OTHER PUBLICATIONS

H. Kashima et al., "Marginalized Kernels Between Labeled Graphs," Proceedings of the Twentieth International Conference on Machine Learning (ICML), Aug. 2003, pp. 321-328, vol. 20, No. 1.

(Continued)

*Primary Examiner* — James Trujillo
*Assistant Examiner* — Soheila Davanlou
(74) *Attorney, Agent, or Firm* — Gail H. Zarick; Ryan, Mason & Lewis, LLP

(57) ABSTRACT

Techniques are disclosed for generating rules for classifying structured documents, and for classifying, retrieving, or checking structured documents, using generated rules. In one example, a method for generating rules for classifying a plurality of electronic structured documents to which a same schema is applied comprises a computer performing the following steps: determining one or more variable portions defined by the schema by scanning the schema; acquiring respective feature values of the determined variable portions from each of the plurality of structured documents and associating the structured document, from which the feature values are acquired, with the acquired feature values; and generating the rules on the basis of the feature values associated with the structured document.

20 Claims, 19 Drawing Sheets

(56) References Cited

FOREIGN PATENT DOCUMENTS

| | | |
|---|---|---|
| JP | 2007052556 A | 3/2007 |
| JP | 2008507789 A | 3/2008 |
| JP | 2008084113 A | 4/2008 |
| JP | 2008541223 A | 11/2008 |

OTHER PUBLICATIONS

D. Peterson et al., "W3C XML Schema Definition Language (XSD) 1.1 Part 2: Datatypes," W3C Candidate Recommendation, Jul. 2011, 159 pages.

T. Bray et al., "Extensible Markup Language (XML) 1.0 (Fifth Edition)," W3C Recommendation, Nov. 2008, 47 pages.

S. Gao et al., "W3C XML Schema Definition Language (XSD) 1.1 Part 1: Structures," W3C Candidate Recommendation, Jul. 2011, 257 pages.

H. Saito et al., "Classification Method of Tree Data Reflecting Structual Similarity and Contents Similarity," The Institute of Electronics, Information and Communication Engineers (IEICE), Technical Report, Jun. 2006, pp. 7-12, vol. 106, No. 99.

\* cited by examiner

FIG. 3

```
311  { 1  <xs:element name="Root" type="tns:Root" />

{ 2  <xs:complexType name="Root" >                                        [1]
       3    <xs:sequence>
       4      <xs:element name="C" type="tns:D" maxOccurs="unbounded" />       [3] [TEN BYTES ]
312    5      <xs:element name="A" type="xsd:string"/>                         [1] [NA]
       6      <xs:element name="B" type="xsd:string" minOccurs="0" />          [0]
       7    </xs:sequence>
       8  </xs:complexType>

{ 9  <xs:complexType name="D" >
      10    <xs:sequence>
313   11      <xs:element name="D" type="xsd:int" maxOccurs="unbounded" />     [3] [THREE BYTES ]
      12    </xs:sequence>
      13  </xs:complexType>
```

[3] ← NUMBER OF REPETITIONS
[THREE BYTES] ← NUMBER OF BYTES

```
1  <xs:element name="PREFECTURE" type="tns:PREFECTURE"/>
2  <xs:complexType name="PREFECTURE">
3   <xs:sequence>
4    <xs:element name="WORKER" type="tns:CITY"/>
5    <xs:element name="SENIOR" type="tns:CITY"/>
6   </xs:sequence>
7   <xs:attribute name="NAME" type="xsd:string"/>
8  </xs:complexType>
9  <xs:complexType name="CITY">
10  <xs:sequence>
11   <xs:element name="CITY" type="tns:POPULATION PROPORTION" maxOccurs="unbounded"/>
12  </xs:sequence>
13  <xs:attribute name="NAME" type="xsd:string"/>
14 </xs:complexType>
15 <xs:complexType name="POPULATION PROPORTION">
16  <xs:sequence>
17   <xs:element name="POPULATION PROPORTION" type="xsd:int"/>
18  </xs:sequence>
19 </xs:complexType>
```

1601

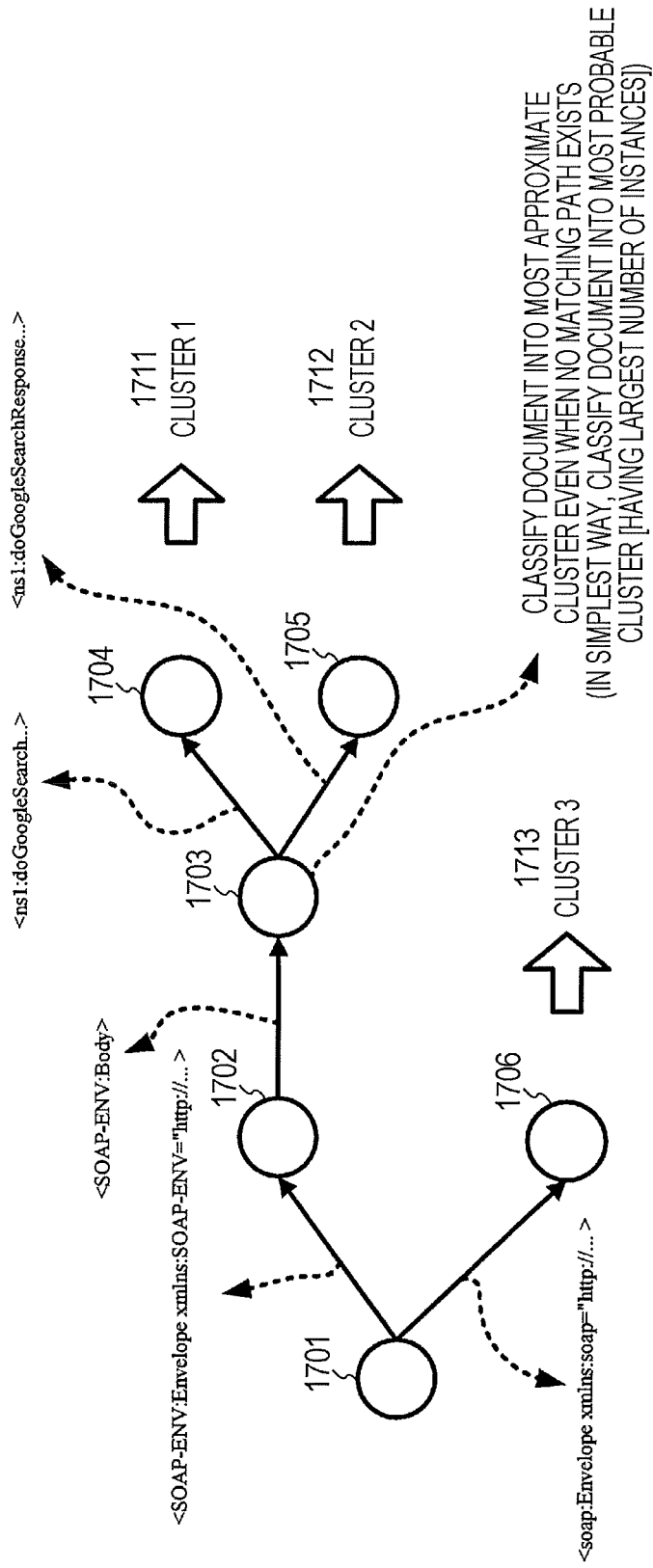

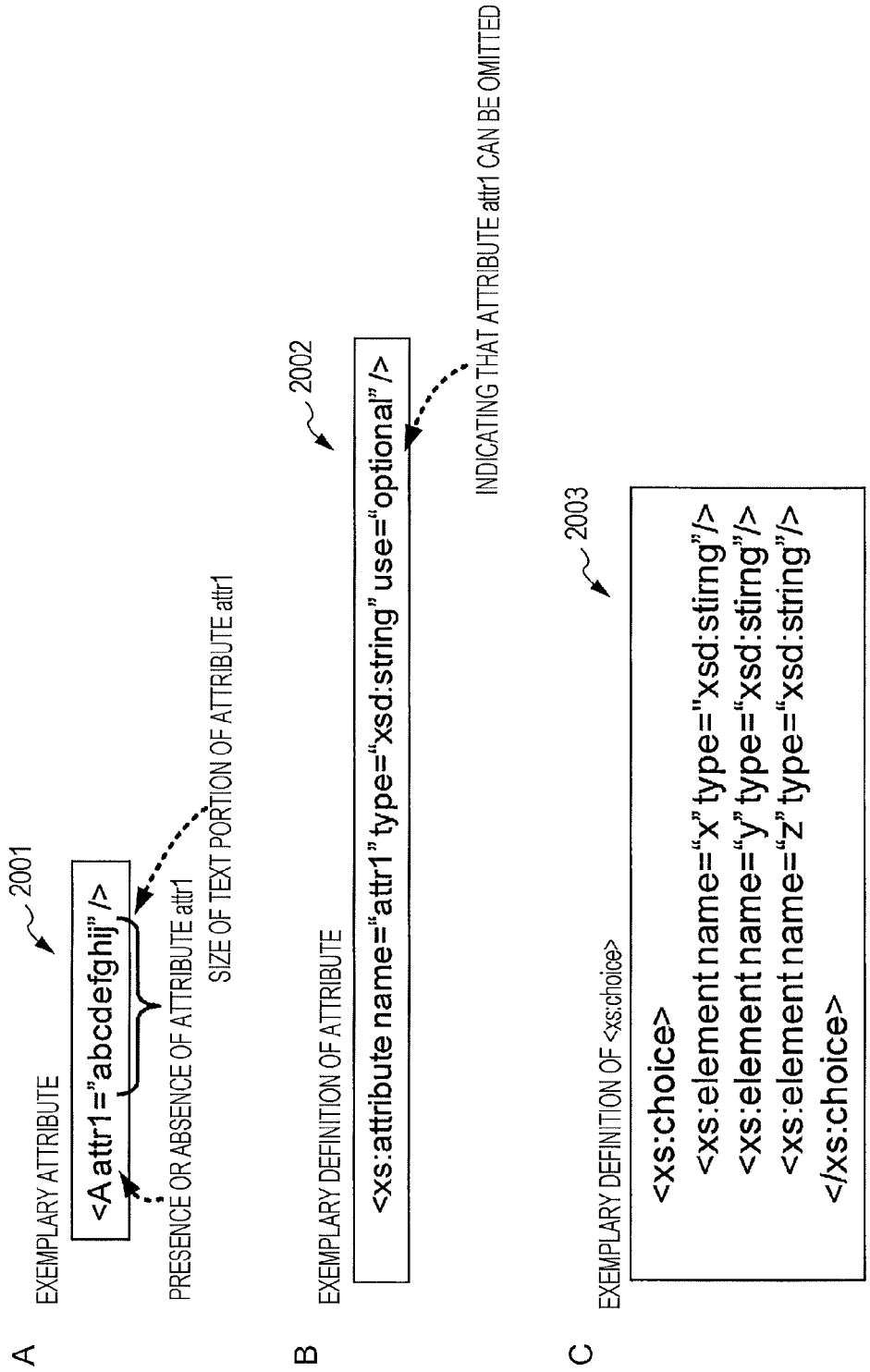

GENERATING RULES FOR CLASSIFYING STRUCTURED DOCUMENTS

PRIORITY CLAIM

The present application claims priority to the Japanese patent application identified as 2010-243910, filed on Oct. 29, 2010, and entitled "A Method for XML Classification by Using Scalar Parameters for Schema Information," the disclosure of which is incorporated by reference herein in its entirety.

FIELD OF THE INVENTION

The present invention generally relates to information processing techniques. In particular, the present invention relates to a method, a computer, and a computer program for generating rules for classifying structured documents. Furthermore, in particular, the present invention relates to a method, a computer, and a computer program for classifying, retrieving, or checking structured documents, using the generated rules.

BACKGROUND OF THE INVENTION

As recent IT (information technology) technology is spread, enterprises or individuals create pieces of content that are electronic data and exchange or release the pieces of content on the Internet on a daily basis. Many pieces of content are created as electronic structured documents in a metalanguage format, such as XML (Extensible Markup Language), HTML (HyperText Markup Language), XHTML (Extensible HyperText Markup Language), or SGML (Standard Generalized Markup Language), and processed in various types of computers.

In relation to a structured document, schema data for defining the document structure of the structured document in a schema language format, such as XML Schema, a document type definition (DTD), Regular Language description for XML (RELAX), RELAX Next Generation (RELAX NG), Name space-based Validation Dispatching Language (NVDL), or Schematron, may be created.

Moreover, recently, XML has come to be used as the file format of office applications, and such exemplary XML is Open Document Format (ODF) or Office Open XML (OOXML).

SUMMARY OF THE INVENTION

Embodiments of the invention provide techniques for generating rules for classifying structured documents, and for classifying, retrieving, or checking structured documents using generated rules.

For example, in one embodiment, a method for generating rules for classifying a plurality of electronic structured documents to which a same schema is applied comprises a computer performing steps of: determining one or more variable portions defined by the schema by scanning the schema; acquiring respective feature values of the determined variable portions from each of the plurality of structured documents and associating the structured document, from which the feature values are acquired, with the acquired feature values; and generating the rules on the basis of the feature values associated with the structured document.

In another embodiment, a method for classifying a plurality of electronic structured documents to which a same schema is applied comprises a computer performing steps of: acquiring respective feature values of one or more variable portions from a structured document to be classified; and classifying the structured document including the acquired feature values by applying the acquired feature values to rules, wherein the rules are rules for determining, on the basis of the feature values of the variable portions of the structured document to be classified, to which set of clustered structured documents the structured document to be classified belongs.

In yet another embodiment, a method for retrieving a structured document similar to a specific structured document from a plurality of electronic structured documents to which a same schema is applied comprises a computer performing steps of: acquiring respective feature values of one or more variable portions from the specific structured document and acquiring a first result by applying the acquired feature values to rules; acquiring respective feature values of one or more variable portions from each of the plurality of structured documents to be searched and acquiring a second result by applying the acquired feature values to the rules for the structured document; and extracting a structured document similar to the specific structured document by comparing, for the structured document, a corresponding one of the second results with the first result, wherein the rules are rules for determining, on the basis of the feature values of the variable portions of the specific structured document or the structured document to be searched, to which set of clustered structured documents the specific structured document or the structured document to be searched belongs.

In a further embodiment of the invention, a method for checking whether electronic structured documents to which a same schema is applied are similar to a specific structured document comprises a computer performing steps of: acquiring respective feature values of one or more variable portions from the specific structured document and acquiring a first result by applying the acquired feature values to rules; acquiring respective feature values of one or more variable portions from a structured document to be checked and acquiring a second result by applying the acquired feature values to the rules; and checking, by comparing the second result with the first result, whether the structured document to be checked is similar to the specific structured document, wherein the rules are rules for determining, on the basis of the feature values of the variable portions of the specific structured document or the structured document to be checked, to which set of clustered structured documents the specific structured document or the structured document to be checked belongs.

In a still further embodiment of the invention, a computer program product is provided for causing a computer to perform the steps in one or more of the above methods.

In yet a further embodiment of the invention, a computer generates rules for classifying a plurality of electronic structured documents to which a same schema is applied, the computer comprising a memory and a processor connected to the memory and reading, into the memory, a program product for causing the processor to perform the steps in one or more of the above methods to generate the rules.

These and other objects, features and advantages of the present invention will become apparent from the following detailed description of illustrative embodiments thereof, which is to be read in connection with the accompanying drawings.

BRIEF DESCRIPTION OF THE DRAWINGS

FIG. 3 illustrates an exemplary schema that may be used in an embodiment of the present invention.

FIG. 16 is an XML schema according to an embodiment of the present invention for the XML documents in FIG. 15.

FIG. 17 illustrates an exemplary automaton according to an embodiment of the present invention used to determine to which cluster an XML document is close from the beginning of the XML document using the rules generated according to the flowchart described in FIG. 8.

FIG. 20 illustrates an exemplary attribute, an exemplary definition of an attribute, and an exemplary definition of an element used in an embodiment of the present invention.

DETAILED DESCRIPTION

Figure 1:
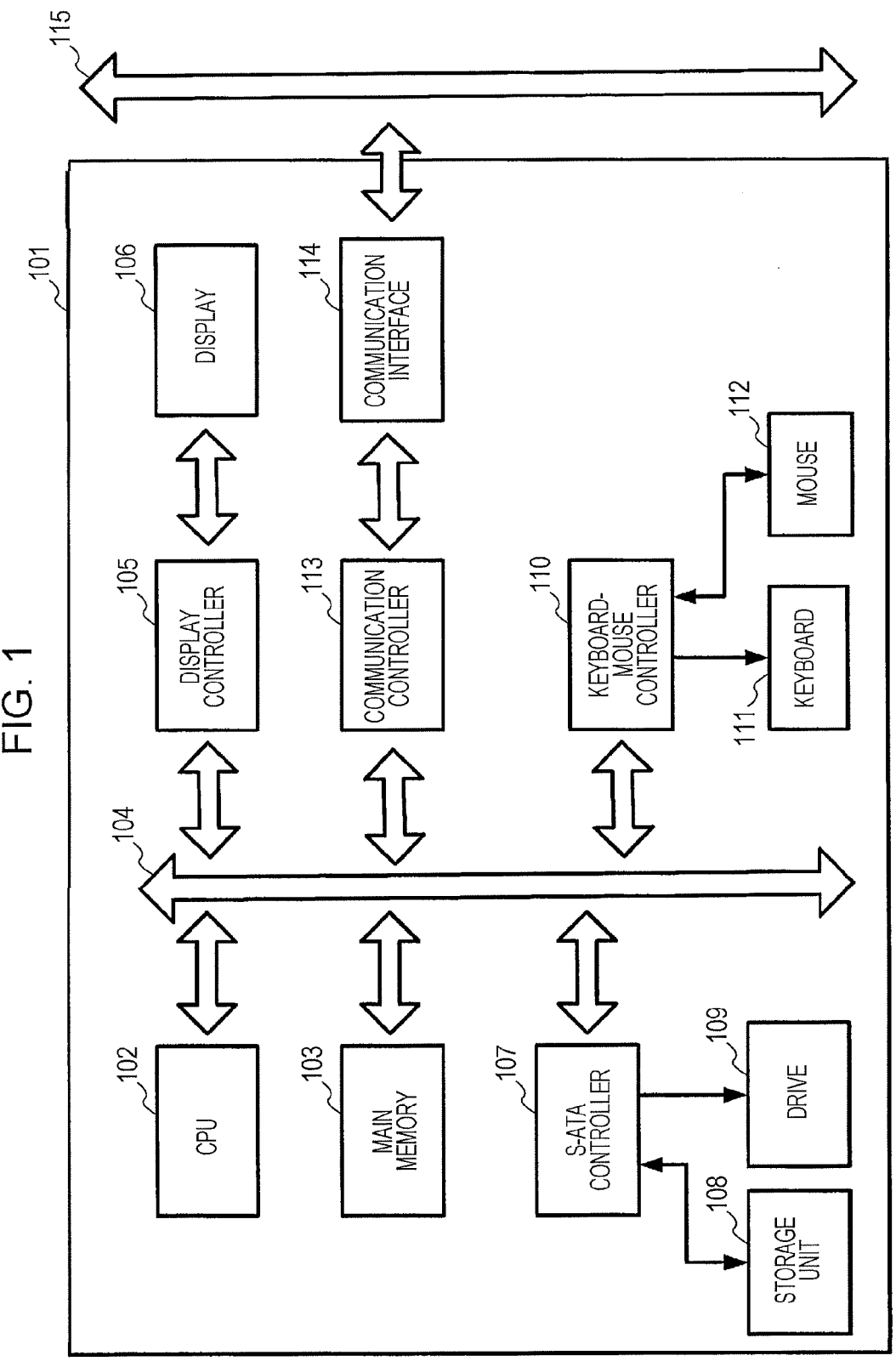
FIG. 1 is a diagram illustrating an exemplary hardware configuration of an information processing apparatus for implementing a computer according to an embodiment of the present invention.

The best mode for carrying out the present invention will now be described in detail on the basis of the drawings. However, the following embodiment does not restrict the invention claimed in the claims. Moreover, all combinations of features described in the embodiment are not necessarily mandatory for the problem-solving means of the invention. Moreover, it is obvious to persons skilled in the art that various changes or improvements can be made in the following embodiment.

While the description will be given in the following embodiments of the present invention, taking an XML document and XML schema as examples, it is obvious to persons ordinarily skilled in the art that other structured document and schema can be used. An embodiment, in which such changes or improvements are made, is also covered by the technical scope of the present invention.

The same numbers are assigned to the same components throughout the description of the embodiment.

Classification of files of office applications (for example, document composition, spreadsheet, and presentation software) is important in, for example, the field of Data Loss Prevention or Data Leak Prevention (DLP). One storage format of office applications is a structured document in a metalanguage format. Since an XML document as a type of structured document is a text file, the XML document can be classified using text mining. However, classification by text mining is classification for a text expression, and the tree structure of XML is not considered in classification by text mining. Moreover, since XML has a tree structure, a technique called graph mining can be used for classification of an XML document. In graph mining, for example, a kernel function between graphs is defined. However, in graph mining, when a large number of unknown documents are classified into some clusters so as to calculate the distance between graphs in a one-to-one relationship, the calculation time is long.

Accordingly, embodiments of the present invention provide a method, a computer, and a computer program for generating rules for efficiently classifying a structured document such as an XML document. Moreover, embodiments of the present invention provide a method, a computer, and a computer program for classifying, retrieving, or checking a structured document using the generated rules.

To achieve such advantageous features, rules are generated using the information of a schema in a format of a schema language, for example, XML Schema, a document type definition (DTD), Regular Language description for XML (RELAX), RELAX Next Generation (RELAX NG), Name space-based Validation Dispatching Language (NVDL), or Schematron. In particular, rules are generated using information on how an actual structured document (for example, an XML document) is constructed for each definition in a schema (for example, an XML schema).

As will be explained in detail herein, an embodiment of the present invention provides a method for generating rules for classifying a plurality of electronic structured documents to which a same schema is applied. The method includes the steps of determining one or more variable portions defined by the schema by scanning the schema, acquiring respective feature values of the determined variable portions from each of the plurality of structured documents and associating the structured document, from which the feature values are acquired, with the acquired feature values, and generating the rules on the basis of the feature values associated with the structured document.

In one embodiment of the present invention, the structured documents are preferably in a format of a metalanguage: XML, HTML, XHTML, SGML, Open Document Format (ODF), or Office Open XML (OOXML). Moreover, in one embodiment of the present invention, the schema is preferably in a format of a schema language: XML Schema, a document type definition (DTD), Regular Language description for XML (RELAX), RELAX Next Generation (RELAX NG), Name space-based Validation Dispatching Language (NVDL), or Schematron.

In one embodiment of the present invention, the step of determining one or more variable portions may include the step of determining one or more elements included in a tree structure defined by the schema or one or more attributes defined by the schema, and the step of associating the structured document with the acquired feature values may include the step of acquiring respective feature values of the determined elements or attributes from each of the plurality of structured documents and associating the structured document, from which the feature values are acquired, with the acquired feature values.

In one embodiment of the present invention, each of the feature values of the determined elements may be a number of repetitions of an element included in the tree structure (i.e., an element in the structured document), a size of a text portion of a simple type element included in the tree structure (i.e., a simple type element in the structured document), a numeric value of a simple type element that is included in the tree structure and represents a numeric value (i.e., a simple type element representing a numeric value in the structured document), or a value associated with a selectable element included in the tree structure (i.e., a selectable element included in the structured document). Moreover, in one embodiment of the present invention, the number of repetitions of an element may the frequency of occurrence of a child element.

In one embodiment of the present invention, each of the feature values of the determined elements may be an average of respective numbers of repetitions of an element included in at least two nodes belonging to a same definition on the schema, an average of respective sizes of text portions of a simple type element included in at least two nodes belonging to a same definition on the schema, an average of respective numeric values of a simple type element representing a numeric value included in at least two nodes belonging to a same definition on the schema, or an average of respective values in association with a selectable element included in at least two nodes belonging to a same definition on the schema.

In one embodiment of the present invention, each of the feature values of the determined attributes may be a value in association with presence or absence of an attribute included in the tree structure or a size of a text portion of an attribute included in the tree structure.

In one embodiment of the present invention, the method for generating the rules may further include the step of associating at least one of the determined elements with an absolute path of the tree structure, and the step of associating the structured document with the acquired feature values may include the step of acquiring respective feature values of the elements associated with the absolute path from each of the plurality of structured documents and associating the structured document, from which the feature values are acquired, with the acquired feature values. Moreover, in one embodiment of the present invention, the step of determining one or more elements may include the steps of selecting a first element by scanning the schema, and assigning, to the selected first element, a name for determining the element as a feature name (hereinafter also called a first feature name). Moreover, in one embodiment of the present invention, the step of associating the structured document with the acquired feature values may include the step of associating the first feature name in the structured document with a feature value corresponding to the first feature name.

In one embodiment of the present invention, the step of determining one or more elements may further include the steps of selecting an element by scanning the schema, a feature name of the element as a name for determining the element being not recorded, the element being a first element following the selected element, and assigning, as a feature name (hereinafter also called a second feature name), a name for determining the element to the first element following the selected element. In one embodiment of the present invention, the step of associating the structured document with the acquired feature values may include the step of associating the second feature name in the structured document with a feature value corresponding to the second feature name.

In one embodiment of the present invention, the step of generating the rules may include the step of generating clustering rules on the basis of the feature values associated with the structured document using a machine learning method, a data mining method, or a statistical method. In one embodiment of the present invention, the clustering rules may be generated using cluster analysis, principal component analysis, vector quantization, a self-organizing map, reinforcement learning, unsupervised learning, the k-means method, or the expectation-maximization method.

Moreover, an embodiment of the present invention provides a method for classifying a plurality of electronic structured documents to which a same schema is applied. The method includes the steps of acquiring respective feature values of one or more variable portions from a structured document to be classified, and classifying the structured document including the acquired feature values by applying the acquired feature values to rules for determining, on the basis of the feature values of the variable portions of the structured document to be classified, to which set of clustered structured documents the structured document to be classified belongs. The rules are generated by the aforementioned method.

Moreover, an embodiment of the present invention provide a method for retrieving a structured document similar to a specific structured document from a plurality of electronic structured documents to which a same schema is applied. The method includes the steps of acquiring respective feature values of one or more variable portions from the specific structured document and acquiring a first result by applying the acquired feature values to rules described below, acquiring respective feature values of one or more variable portions from each of the plurality of structured documents to be searched and acquiring a second result by applying the acquired feature values to the rules described below, and extracting a structured document similar to the specific structured document by comparing, for the structured document, a corresponding one of the second results with the first result. The rules are rules for determining, on the basis of the feature values of the variable portions of the specific structured document or the structured document to be searched, to which set of clustered structured documents the specific structured document or the structured document to be searched belongs. The rules are generated by the aforementioned method.

Moreover, an embodiment of the present invention provide a method for checking whether electronic structured documents to which a same schema is applied are similar to a specific structured document. The method includes the steps of acquiring respective feature values of one or more variable portions from the specific structured document and acquiring a third result by applying the acquired feature values to rules described below, acquiring respective feature values of one or more variable portions from a structured document to be checked and acquiring a fourth result by applying the acquired feature values to the rules described below, and checking, by comparing the fourth result with the third result, whether the structured document to be checked is similar to the specific structured document. The rules are rules for determining, on the basis of the feature values of the variable portions of the specific structured document or the structured document to be checked, to which set of clustered structured documents the specific structured document or the structured document to be checked belongs.

While the outline of the present invention has been described as a method for generating rules for classifying a plurality of electronic structured documents to which a same schema is applied and a method for classifying, retrieving, or checking the structured documents using the rules, embodiments of the present invention may be viewed as a computer program, a program product, software, or a software product. The program product or software product may include, for example, a storage medium for storing the aforementioned program or software or a transmission medium for transmitting the program or software.

Moreover, an embodiment of the present invention provides a computer generating rules for classifying a plurality of electronic structured documents to which a same schema is applied. In one embodiment of the present invention, the computer includes a memory and a processor connected to the memory and reads, into the memory, a program for causing the processor to perform the steps in the aforementioned method to generate the rules. In another embodiment of the present invention, the computer includes a determination unit determining one or more variable portions defined by the schema by scanning the schema, an acquisition unit acquiring respective feature values of the determined variable portions from each of the plurality of structured documents and associating the structured document, from which the feature values are acquired, with the acquired feature values, and a rule generation unit generating the rules on the basis of the feature values associated with the structured document.

In one embodiment of the present invention, the determination unit may determine one or more elements included in a tree structure defined by the schema or one or more attributes defined by the schema. Moreover, the acquisition unit may acquire respective feature values of the determined elements or attributes from each of the plurality of structured documents and associate the structured document, from which the feature values are acquired, with the acquired feature values.

Moreover, an embodiment of the present invention provides a computer classifying a plurality of electronic structured documents to which a same schema is applied. The computer includes a determination unit, an acquisition unit, and a classification unit. The determination unit determines, by scanning the schema, one or more variable portions defined by the schema in each of the plurality of structured documents to be classified. The acquisition unit acquires respective feature values of the one or more variable portions from the structured document to be classified. The classification unit classifies the structured document including the acquired feature values by applying the acquired feature values to rules generated by the rule generation unit.

Moreover, an embodiment of the present invention provides a computer retrieving a structured document similar to a specific structured document from a plurality of electronic structured documents to which a same schema is applied. The computer includes a determination unit, an acquisition unit, and a retrieval unit. The determination unit determines, by scanning the schema, one or more variable portions defined by the schema in each of the specific structured document and the plurality of structured documents to be searched. The acquisition unit acquires respective feature values (hereinafter also called first feature values) of the determined variable portions from the specific structured document and acquires respective feature values (hereinafter also called second feature values) of the determined variable portions from each of the plurality of structured documents to be searched. The retrieval unit acquires a first result by applying the first feature values to rules generated by the rule generation unit and acquires a second result by applying, for the structured document, the second feature values to the rules generated by the rule generation unit. The retrieval unit extracts a structured document similar to the specific structured document by comparing the second results with the first result.

Moreover, an embodiment of the present invention provides a computer checking whether electronic structured documents to which a same schema is applied are similar to a specific structured document. The computer includes a determination unit, an acquisition unit, and a check unit. The determination unit determines, by scanning the schema, one or more variable portions defined by the schema in each of the specific structured document and the plurality of structured documents to be checked. The acquisition unit acquires respective feature values (hereinafter also called third feature values) of the determined variable portions from the specific structured document and acquires respective feature values (hereinafter also called fourth feature values) of the determined variable portions from each of the structured documents to be checked. The check unit acquires a third result by applying the third feature values to rules generated by the rule generation unit and acquires a fourth result by applying the fourth feature values to the rules generated by the rule generation unit. The check unit checks whether the structured document to be checked is similar to the specific structured document by comparing the fourth result with the third result.

It should be noted that the aforementioned outline of the invention does not include all necessary features of the present invention, and a combination or a sub-combination of these components may also constitute the invention.

Persons ordinarily skilled in the art can easily presume various modifications in which, for example, the individual hardware components of the computer used in the embodiment of the present invention are implemented by combining a plurality of machines and allocating functions to the machines. These modifications represent concepts that are justifiably included in an idea of the present invention. However, these components are illustrative, and all the components are not essential components of the present invention.

Moreover, embodiments of the present invention may be implemented as hardware, software, or a combination of hardware and software. Embodiments in the form of a combination of hardware and software include, as a typical embodiment, an embodiment in the form of a data processing system including a predetermined program. In such a case, the predetermined program controls the data processing system and causes the data processing system to perform the processes according to the present invention by being loaded into the data processing system and executed. The program is composed of a command group that can be represented by a predetermined language, code, or notation. Such a command group allows the system to execute a specific function directly or after one or both of: (1) conversion to another language, code, or notation; and (2) copying to another medium.

Moreover, the scope of the present invention encompasses not only such a program but also a medium recording the program. The program for performing the functions of the present invention may be stored in any computer-readable recording medium such as a flexible disk, an MO, a CD-ROM, a DVD, a hard disk unit, a ROM, an MRAM, or a RAM. Such a program may be downloaded from another data processing system connected through a communication line or copied from another recording medium so as to be stored in the recording medium. Moreover, such a program may be compressed or divided into a plurality of pieces to be stored in a single recording medium or a plurality of recording media. Moreover, it should be noted that a program product implementing the present invention can be justifiably provided in various forms.

In accordance with embodiments of the present invention, a structured document can be classified at a high speed, considering the tree structure of the structured document, by using information on how an actual structured document is constructed for each definition in a schema. Moreover, the structured document can be classified, retrieved, and checked at a high speed by applying an existing machine learning method, data mining method, or statistical method to feature values acquired from the tree structure.

We now turn to the figures to provide illustrative detailed explanation of the above inventive features.

FIG. 1 is a diagram illustrating an exemplary hardware configuration of an information processing apparatus for implementing a computer according to an embodiment of the present invention.

A computer (101) includes a CPU (102) and a main memory (103) connected to a bus (104). The CPU (102) is preferably based on the 32-bit or 64-bit architecture. For example, the Core i (trademark) series, the Core 2 (trademark) series, the Atom (trademark) series, the Xeon (trademark) series, the Pentium (registered trademark) series, or the Celeron (registered trademark) series of Intel Corporation or the Phenom (trademark) series, the Athlon (trademark) series, the Turion (trademark) series, or Sempron (trademark) of AMD may be used as the CPU (102). A display (106) such as a liquid crystal display (LCD) may be connected to the bus (104) via a display controller (105). The display (106) is used to display, for management of computers, information on a computer connected to a network via a communication line and information on software running on the computer using an appropriate graphics interface. A storage unit (108) such as a hard disk or silicon disk and a drive (109) such as a CD, DVD, or BD drive may be connected to the bus (104) via an SATA or IDE controller (107). Moreover, a keyboard (111) and a mouse (112) may be connected to the bus (104) via a keyboard-mouse controller (110) or USB bus (not shown).

An operating system, programs providing a Java (registered trademark) processing environment, Java (registered trademark) applications, a Java (registered trademark) virtual machine (VM), and a Java (registered trademark) just-in-time (JIT) compiler, such as J2EE, other programs, and data are stored in the storage unit (108) to be loadable to the main memory.

The drive (109) is used to install a program from a CD-ROM, DVD-ROM, or BD to the storage unit (108) as necessary.

A communication interface (114) is based on, for example, the Ethernet (registered trademark) protocol. The communication interface (114) is connected to the bus (104) via a communication controller (113), physically connects the computer (101) to a communication line (115), and provides a network interface layer to the TCP/IP communication protocol of a communication function of the operating system of the computer (101). In this case, the communication line may be a wired LAN environment or a wireless LAN environment based on wireless LAN connectivity standards, for example, IEEE 802.11a/b/g/n.

From the foregoing description, it will readily be understood that the computer according to the embodiment of the present invention is implemented via a general information processing apparatus, such as a personal computer, a workstation, or a mainframe, or a system including a combination of them.

In a data processing system according to the embodiment of the present invention, an operating system supporting a graphical user interface (GUI) multi-window environment may be adopted, such as Windows (trademark) Operating System provided by Microsoft Corporation, MacOS (trademark) provided by Apple Computer, Inc., or a UNIX (trademark)-based system including X Window System (for example, AIX (trademark) provided by International Business Machines Corporation (trademark)).

From the foregoing description, it will be understood that the data processing system used in the embodiment of the present invention is not limited to a specific multi-window operating system environment.

Figure 2:
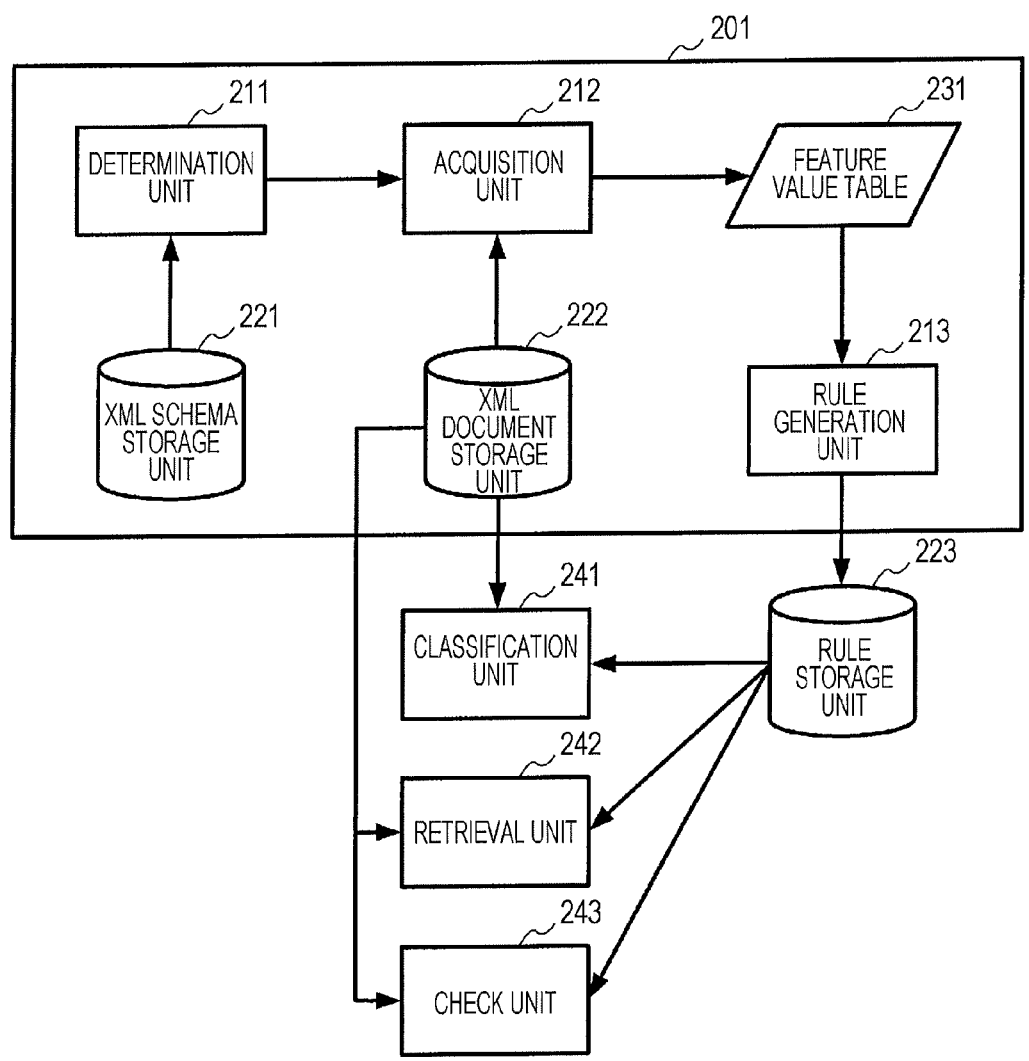
FIG. 2 is a functional block diagram of the computer according to the embodiment of the present invention including the hardware configuration in FIG. 1.

FIG. 2 is a functional block diagram of the computer according to the embodiment of the present invention including the hardware configuration in FIG. 1.

A computer (201) according to the embodiment of the present invention includes, in addition to, for example, the CPU (102), the main memory (103), and the storage unit (108) shown in FIG. 1, a determination unit (211), an acquisition unit (212), and a rule generation unit (213). The computer (201) may further include an XML schema storage unit (221), an XML document storage unit (222), and a feature value table (231). The computer (201) may further include a rule storage unit (223). The computer (201) may further include at least one of a classification unit (241), a retrieval unit (242), and a check unit (243). In this case, another computer (not shown) separate from the computer (201) may include at least one of the rule storage unit (223), the classification unit (241), the retrieval unit (242), and the check unit (243). The components shown in the functional block diagram in FIG. 2 can be implemented by loading computer programs stored in, for example, the storage unit (108), such as the operating system and authoring software, into the main memory (103), then causing the CPU (102) to read the computer programs, and causing hardware resources and software to cooperate with each other on the computer (101) including the hardware configuration illustrated in FIG. 1.

The determination unit (211) scans a schema to determine one or more variable portions defined by the schema. The definition of each schema includes a portion that is uniquely determined and a portion that varies (variable portion). In the embodiment of the present invention, regarding a variable portion, information indicating what structure an XML document has is recorded in association with an XML schema. The determination unit (211) may determine, as a variable portion, for example, one or more elements included in a tree structure defined by a schema or one or more attributes defined by a schema.

For example, in the case of an XML schema, an element may be defined using a definition such as an <xs:element> tag or <xs:complex> tag (hereinafter also simply called an <element> definition) (refer to FIG. 3 described below). Moreover, an element includes, for example, a simple type element.

For example, in the case of an XML schema, an attribute may be defined by an <A attr> tag (refer to "A. Exemplary Attribute" and "B. Exemplary Definition of Attribute" in FIG. 20 described below).

The acquisition unit (212) acquires the feature value of an element determined in the determination unit (211) from each of one or more structured documents. A feature value is a value that can be acquired from a variable portion of a schema.

When a variable portion is an element, the feature value of the element includes, for example, the number of repetitions of an element included in a tree structure (i.e., an element in a structured document), the size of a text portion of a simple type element, a numeric value of a simple type element representing a numeric value, or a value in association with a selectable element included in a tree structure (i.e., a selectable element included in a structured document). In particular, when a variable portion is a simple type element, the feature value of the simple type element includes the size of a text portion of a simple type element or a numeric value of a simple type element representing a numeric value. Moreover, the feature value of the element includes, for example, the average of the respective numbers of repetitions of an element included in at least two nodes belonging to the same definition on a schema, the average of the respective sizes of text portions of a simple type element included in at least two nodes belonging to the same definition on a schema, the average of respective numeric values of a simple type element representing a numeric value included in at least two nodes belonging to the same definition on a schema, or the average of respective values in association with a selectable element included in at least two nodes belonging to the same definition on a schema.

When a variable portion is an attribute, the feature value of the attribute includes, for example, a value in association with presence or absence of an attribute included in a tree structure or the size of a text portion of an attribute.

The number of repetitions of an element included in a tree structure is, for example, the number of repetitions of an <xs:element> tag or <xs:complex> tag that is an <element> definition, e.g., the frequency of occurrence of a child element in a tree structure (refer to FIG. 3).

A value in association with a selectable element represents a value determined in a manner that depends on, for example, which is selected for <xs:choice>, as shown in FIG. 20C described below (2003). When "x", "y", and "z" can be selected as "element name" in <xs:choice>, as shown in FIG. 20C, for example, "x", "y", and "z" are associated respectively with a value of zero, a value of one, and a value of two as feature values, or "x", "y", and "z" are associated with a value of zero or one as feature values in advance. In the latter case, the feature value is identical to each of the respective numbers of repetitions of "x", "y", and "z".

The size of a text portion of a simple type element is the size of a text portion of an attribute and may be, for example, the number of characters or number of bytes of xsd:string or xsd:int. Regarding the size of a text portion of an attribute, for example, since the number of characters of a text portion "abcdefghij" of an attribute attr1 is ten, as shown in FIG. 20A described below (2001), the feature value is ten.

A numeric value of a simple type element representing a numeric value is a numeric value.

A value in association with presence or absence of an attribute is, for example, one in the case of presence of an attribute specified by a schema in a structured document and zero in the case of absence of the attribute. For example, FIG. 20A described below illustrates an exemplary attribute (2001). For example, in a case where the attribute attr1 specified by a schema exists in a structured document (i.e., in the case of presence of the attribute), the value is one, and in a case where the attribute does not exist (i.e., in the case of absence of the attribute), the value is zero. Moreover, FIG. 20B illustrates an exemplary definition of an attribute (2002) and shows that the attribute attr1 can be omitted.

The size of a text portion of an attribute is, for example, the size of the text portion "abcdefghij" belonging to the attribute attr1 specified by a schema in a structured document, as shown in FIG. 20A. In the case of the aforementioned example in FIG. 20A, the feature value is ten.

The feature value of a variable portion is a scalar value and is used to generate rules in the embodiment of the present invention.

The acquisition unit (212) associates each acquired feature value with a structured document from which the feature value is acquired.

In one embodiment of the present invention, the determination unit (211) determines one or more elements included in a tree structure defined by a schema or one or more attributes defined by a schema. In response to this operation, the acquisition unit (212) acquires the respective feature values of the determined elements or attributes from each of a plurality of structured documents and associates the acquired feature values with the structured document, from which the feature values are acquired.

In another embodiment of the present invention, the determination unit (211) may select the first element by scanning a schema and assign, to the selected first element, a name for determining the element as a feature name (a first feature name). In response to this operation, the acquisition unit (212) may associate the first feature name of a structured document with a feature value corresponding to the first feature name.

In yet another embodiment of the present invention, the determination unit (211) may select an element by scanning a schema, the feature name of the element as a name for determining the element being not recorded, the element being the first element following the selected element, and assign, as a feature name (a second feature name), a name for determining the element to the first element following the selected element. In response to this operation, the acquisition unit (212) may associate the second feature name of a structured document with a feature value corresponding to the second feature name.

In yet another embodiment of the present invention, the determination unit (211) may associate at least one (for example, a child element) of determined elements with an absolute path of a tree structure, for example, XPath. In response to this operation, the acquisition unit (212) may acquire a feature value of the element associated with the absolute path from each of one or more structured documents and associate the acquired feature value with the structured document, from which the feature value is acquired.

The feature value table (231) is a table for storing an element determined in the determination unit (211) and the feature value of the element for each XML document. The feature value table (231) is stored in, for example, a storage unit. Refer to examples of the feature value table (231) shown in FIGS. 5 and 12 described below.

The rule generation unit (213) reads the aforementioned table stored in the feature value table (231) and generates rules on the basis of feature values in association with structured documents in the table. In particular, the rule generation unit (213) generates clustering rules on the basis of feature values in association with structured documents, using, for example, a machine learning method, a data mining method, or a statistical method. The rule generation unit (213) generates, using, for example, pieces of training data of a predetermined number of XML documents, rules for classifying the pieces of training data into some clusters (also called clustering rules). The number of pieces of training data may vary with the method for generating rules and the field of data of structured documents.

In generation of rules, existing methods can be appropriately used as a machine learning method, a data mining method, and a statistical method. For example, cluster analysis, principal component analysis, vector quantization, a self-organizing map, reinforcement learning, unsupervised learning, the k-means method, or the expectation-maximization method may be used.

Rules generated in the rule generation unit (213) may be used to classify a structured document to be classified, retrieve a structured document to be retrieved, or check a structured document to be checked. Classification of a structured document, retrieval of a structured document, and check of a structured document are performed in the classification unit (241), the retrieval unit (242), and the check unit (243), respectively.

The XML schema storage unit (221) is a storage unit storing XML schemas. An XML schema is a document for describing the structure of an XML document.

The XML document storage unit (222) is a storage unit storing the data of XML documents to be processed. An XML document is an electronic structured document in conformity with a language created using XML language that is a meta-language. The content of an XML document must conform to the specification of XML language and restrictions defined in an XML schema to be applied. In the description, the explanation is given, using exemplary XML documents and XML schemas. It should be noted that persons skilled in the art can appropriately prepare an XML document and an XML schema in conformity to, for example, specifications defined by the standards of Non Patent Literatures 2, 3, and 4. Moreover, since persons skilled in the art having read the description can create variations by, for example, making a supplement to, an addition to, and a change in the content, more detailed explanation is omitted.

The rule storage unit (223) stores rules generated in the rule generation unit (213).

The classification unit (241) classifies a plurality of electronic structured documents to which the same schema is applied. In particular, the classification unit (241) reads the aforementioned rules generated in the rule generation unit (213) from the rule storage unit (223) and applies the respective feature values of variable portions acquired from the structured documents to the rules to classify the structured documents.

The retrieval unit (242) retrieves a structured document similar to a specific structured document from a plurality of electronic structured documents to which the same schema is applied. In particular, the retrieval unit (242) reads the aforementioned rules generated in the rule generation unit (213) from the rule storage unit (223) and applies the respective feature values of variable portions acquired from a specific structured document to the rules to acquire a first result. Moreover, the retrieval unit (242) reads the aforementioned rules generated in the rule generation unit (213) from the rule storage unit (223) and applies the respective feature values of variable portions acquired from each of structured documents to be searched to the rules to acquire a second result. Then, the retrieval unit (242) extracts a structured document similar to the specific structured document by comparing each of the second results with the first result.

The check unit (243) checks whether electronic structured documents to which the same schema is applied are similar to a specific structured document. In particular, the check unit (243) reads the aforementioned rules generated in the rule generation unit (213) from the rule storage unit (223) and applies the respective feature values of elements acquired from a specific structured document to the rules to acquire a third result. Moreover, the check unit (243) reads the aforementioned rules generated in the rule generation unit (213) from the rule storage unit (223) and applies the respective feature values of elements acquired from a structured document to be checked to the rules to acquire a fourth result. Then, the check unit (243) checks, by comparing the fourth result with the third result, whether the structured document to be checked is similar to the specific structured document.

FIG. 3 illustrates an exemplary schema that may be used in the embodiment of the present invention.

A schema (301) in FIG. 3 is an exemplary XML schema. This XML schema is used to generate rules for classifying a structured document (an XML document) shown in FIG. 4 described below. In the schema (301), a figure at the left of each line (first to thirteenth lines) is assigned for convenience of explanation.

In a schema, for example, regarding the number of occurrences of an element (a feature value), for example, minOccurs represents the minimum number of occurrences of an element; maxOccurs represents the maximum number of occurrences of an element; and "unbounded" shows that there is no limitation on the maximum number of occurrences of an element that may be defined by the following attributes. For example, the specification of the number of occurrences may be defined as follows.

Exemplary Specification of Number of Occurrences
minOccurs="0" maxOccurs="1"; zero times or once
minOccurs="A" maxOccurs="B"; A times or more and B times or less
minOccurs="0" maxOccurs="B"; zero times or more and B times or less
minOccurs="A" maxOccurs="unbounded"; A times or more
minOccurs="0" maxOccurs="unbounded"; zero times or more
minOccurs="0"; zero times or more and once or less
maxOccurs="unbounded"; once or more
(no specification); once (in the case of no definition of minOccurs, a one-time occurrence is assumed)

In the XML schema (301), the structure of an element called "Root" (hereinafter called a "Root" element) is defined. The "Root" element is declared using an <xs:element> tag.

A code portion (311) of the XML schema represents declaration of the "Root" element. A code portion (312) defines the structure of the highest level of the "Root" element. This example describes that the following child elements occur in the "Root" element in sequence: "C" (fourth line), "A" (fifth line), and "B" (sixth line).

The fourth line describes that the child element "C" occurs once or more (maxOccurs="unbounded"). The fourth line further describes that the child element "C" includes a lower-level element "D" (called a grandchild element for convenience) (type="tns:D"). The fifth line describes that the child element "A" occurs once (no definition of minOccurs and maxOccurs), a character string is described (type="xsd:string"), and there is no lower level because the type of the fifth line is a simple type (a character string type [xsd:string]). The sixth line describes that the child element "B" occurs zero times or more and once or less (minOccurs="0" and no definition of maxOccurs), and a character string is described and there is no lower level (type "xsd:string").

A code portion (313) defines the structure of the highest level of the "D" element. This example describes that the child element "D" (eleventh line) occurs in the "Root" element once or more (maxOccurs="unbounded"), and an integer is described and there is no lower level (type="xsd:int").

In this case, the "Root" element is declared as an independent element in the schema (301), using an <element> definition, and thus can occur independently in an XML document. In contrast, each of the elements "A", "B", "C", and "D" is declared as a child element of another element, and thus, cannot be used independently in an XML document and is allowed only to occur as a child element of another element described in an XML schema.

Figure 4:
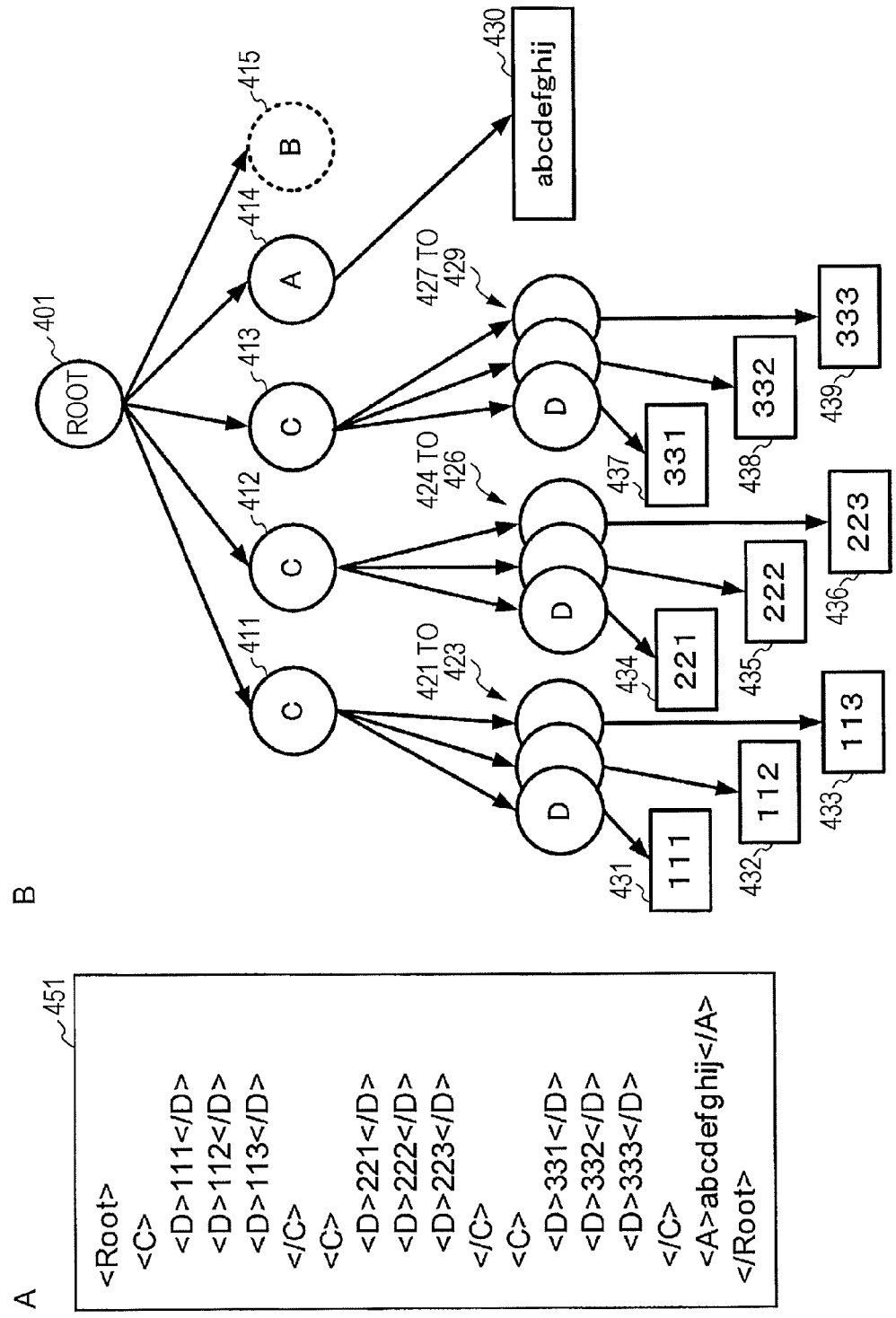
FIG. 4 illustrates an exemplary structured document (FIG. 4A) that may be used in an embodiment of the present invention, corresponding to the schema illustrated in FIG. 3, and an example in a case where the structured document is expressed in a tree structure (FIG. 4B).

FIG. 4 illustrates an exemplary structured document (FIG. 4A) that may be used in the embodiment of the present invention, corresponding to the schema illustrated in FIG. 3, and an example in a case where the structured document is expressed in a tree structure (FIG. 4B).

FIG. 4A is an exemplary XML document (451).

FIG. 4B is the XML document (451) (file name: foo.xml) shown in FIG. 4A expressed in a tree structure. The "Root" element is a parent node (401), the elements "C" and "A" are child nodes (411, 412, 413, 414), and the elements "D" are grandchild nodes (421 to 423, 424 to 426, 427 to 429). The element "B" (child node) (415) does not exist (thus, indicated by a dotted line in FIG. 4B).

The determination unit (211) manipulates the schema (301) and determines one or more variable portions defined by the schema (for example, defined by an element or an attribute). The acquisition unit (212) acquires the respective feature values of the determined variable portions from the structured document shown in FIG. 4A.

When determined elements are <element> definitions "Root", "C", "A", "B", and "D", the feature value of each of the elements is the number of repetitions of the <element> definition and, in particular, is as follows. When "element name" is "Root" in the first line in the schema in FIG. 3, the number of repetitions is one (401). When "element name" is "C" in the fourth line in the schema, the number of repetitions is three (411, 412, and 413). When "element name" is "C" in the fourth line in the schema, the number of repetitions is three (411, 412, and 413). When "element name" is "A" in the fifth line in the schema, the number of repetitions is one (414). When "element name" is "B" in the sixth line in the schema, the number of repetitions is zero (415). When "element name" is "D" in the eleventh line in the schema, the number of repetitions is nine (421 to 423, 424 to 426, 427 to 429). However, the farther a node is from a root, the more the number of nodes is. Thus, for example, in a grandchild node or lower-level node, the average may be set to be the feature value. Thus, in the eleventh line, since the average of the numbers of nodes of "xsd:int" is three, the feature value is three.

When determined elements are simple type elements "xsd:string" (fifth line), "xsd:string" (sixth line), and "xsd:int" (eleventh line), the feature value of each of the simple type elements is the size of the simple type element (the number of bytes) and, in particular, is as follows. In the fifth line, the number of bytes of "xsd:string" is ten bytes of "abcdefghij". In the sixth line, the number of bytes of "xsd:string" is zero (N/A). This is because, since the element "B" does not exist, the size of a text portion of "B" cannot be evaluated. In the eleventh line, the number of bytes of "xsd:int" is, in total, 27 bytes of "111" (431), "112" (432), "113" (433), "221" (434), "222" (435), "223" (436), "331" (437), "332" (438), and "333" (439). However, the farther a node is from a root, the more the number of bytes is. Thus, for example, in a grandchild node or lower-level node, the average may be set to be the feature value. Thus, in the eleventh line, the number of bytes (average) of "xsd:int" is three.

Figure 5:
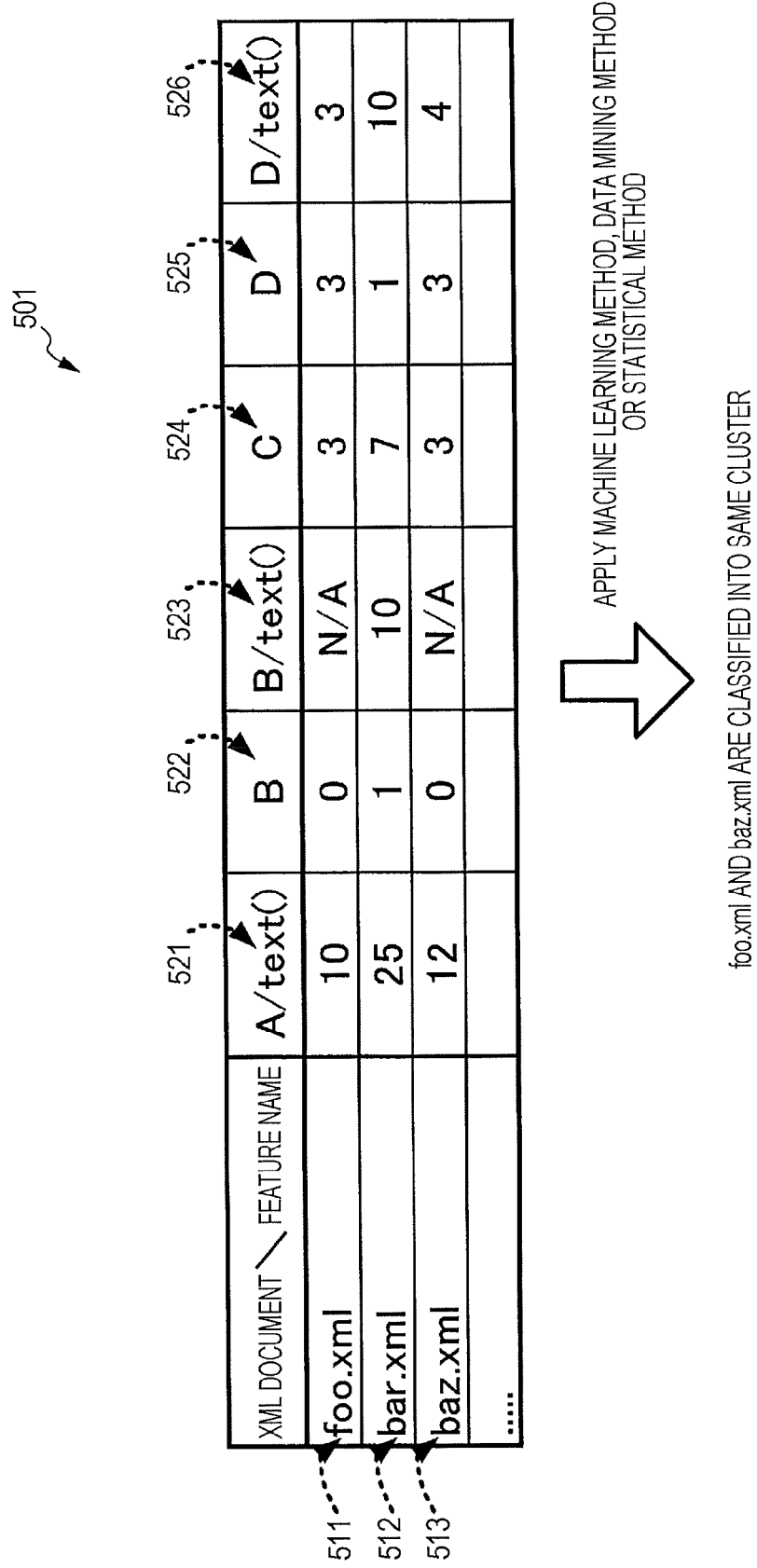
FIG. 5 is a table according to an embodiment of the present invention showing feature names and corresponding feature values used to classify the structured document shown in FIG. 4A and another structured document.

FIG. 5 is a table according to the embodiment of the present invention showing feature names and corresponding feature values used to classify the structured document shown in FIG. 4A and another structured document.

A feature value table (501) in FIG. 5 includes feature names (521 to 526) and feature values regarding XML documents (foo.xml, bar.xml, and baz.xml) (511 to 513) in a case where the schema shown in FIG. 3 is applied.

In the feature value table (501) in FIG. 5, an expression determining an element definition of the XML schema (301) is used as a feature name for a feature value that is the number of repetitions of an element. Thus, in the case of the structured document shown in FIG. 4A, the element names Root, A, B, C, and D are used as feature names for determining element definitions of the XML schema (301). Moreover, for example, the element definition of an element to which "/text( )" is appended may be used as a feature name for a feature value that is the size of a text portion of the element. Thus, in the case of the structured document shown in FIG. 4A, each of Root/text( ) A/text( ), B/text( ), C/text( ), and D/text( ) acquired by appending "/text( )" to the respective element names Root, A, B, C, and D may be used as a feature value for determining the size of a text portion of an element.

Feature names in the feature value table (501) are A/text( ), B, B/text( ), C, D, and D/text( ). In this case, the feature value table (501) may include or not include feature names Root, Root/text( ), A, and C/text( ). This is because the feature value of each of the feature names Root, Root/text( ) A, and C/text( ) is zero and thus cannot be data used in machine learning. When the feature value table (501) includes the feature names Root, Root/text( ) A, and C/text( ), the rule generation unit (213) only needs to not read feature values regarding the feature names into the memory.

Feature values corresponding to the feature names A/text( ), B, B/text( ), C, D, and D/text( ) of foo.xml (511), which is the XML document in FIG. 4A, are 10, 0, N/A, 3, 3 (average), and 3 (average), respectively, as described in FIG. 4.

Feature values corresponding to the aforementioned feature names of bar.xml (512) (the code is not shown) are 25, 1, 10, 7, 1 (average), and 10 (average), respectively.

Feature values corresponding to the aforementioned feature names of baz.xml (513) (the code is not shown) are 12, 0, N/A, 3, 3 (average), and 4 (average), respectively.

The feature value table (501) is stored in the feature value table (231).

The rule generation unit (213) reads the feature value table (501) from the feature value table (231) into the memory and generates rules regarding the schema shown in FIG. 3 on the basis of feature names and corresponding feature values using a machine learning method, a data mining method, or a statistical method. The generated rules are stored in the rule storage unit (223).

In the example in FIG. 5, the rule generation unit (213) generates rules using all the feature values of foo.xml (511), bar.xml (512), and baz.xml (513). The generated rules are for classifying a cluster for foo.xml (511) and baz.xml (513) and a cluster for bar.xml (512). In the case of this example, while rules are generated, the classification unit (241) may classify foo.xml (511), bar.xml (512), and baz.xml (513) that are input data. The classification unit (241) classifies foo.xml (511) and baz.xml (513) into the same cluster. In this case, when classifying an XML document other than foo.xml (511), bar.xml (512), and baz.xml (513) according to the generated rules, the classification unit (241) reads the rules stored in the rule storage unit (223) and performs classification. That is, it should be noted that generation of rules and classification of a structured document are not performed at the same time.

Figure 6:
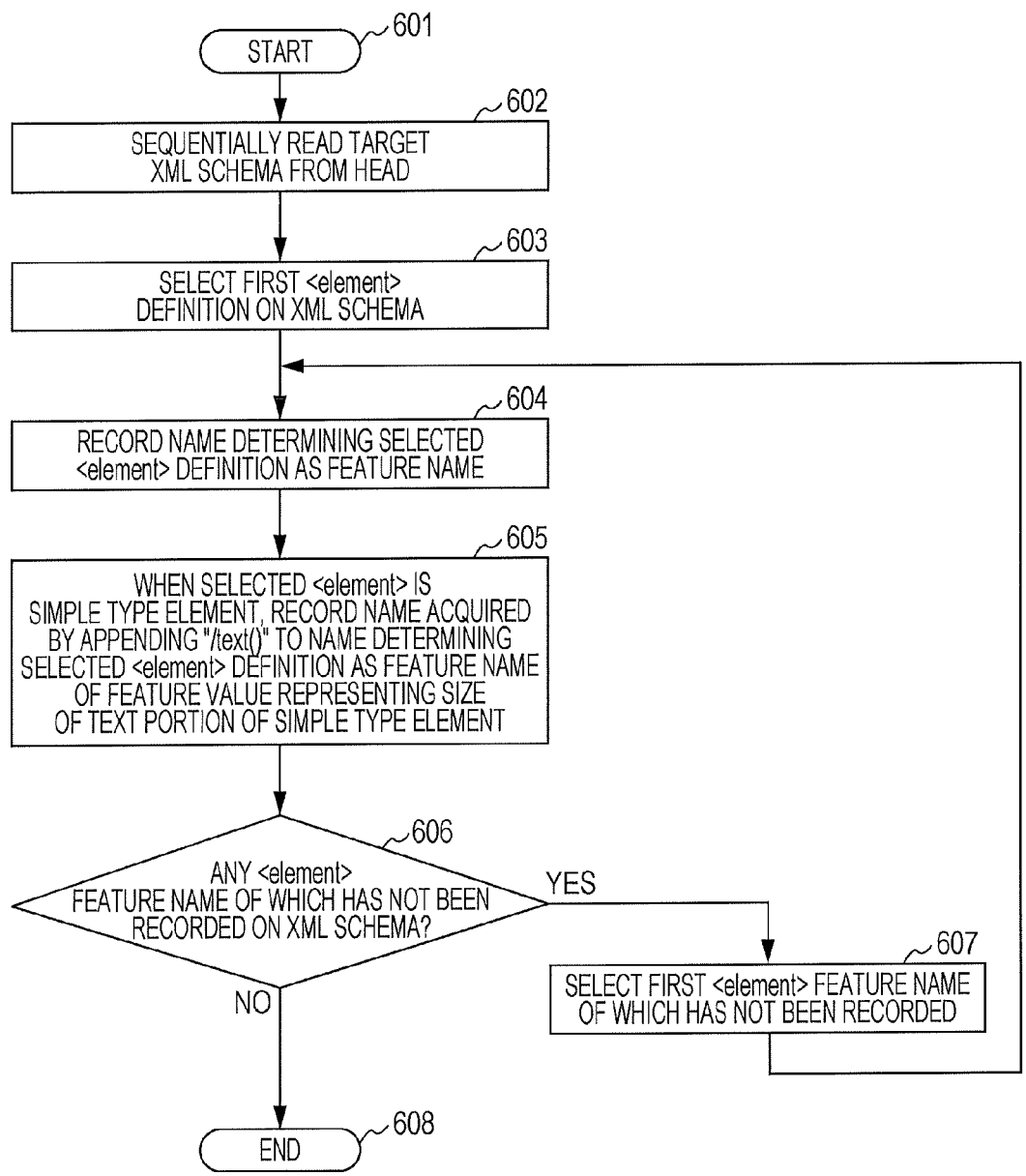
FIG. 6 shows a flowchart of a process according to an embodiment of the present invention of reading an XML schema and listing feature names.

FIG. 6 shows a flowchart of a process according to the embodiment of the present invention of reading an XML schema and listing feature names.

In step 601, the determination unit (211) starts an algorithm for listing feature names.

In step 602, the determination unit (211) loads a target XML schema (for example, the schema (301) in FIG. 3) from the XML schema storage unit (221) into the memory and sequentially reads the content of the XML schema from the head.

In step 603, the determination unit (211) selects an element occurring first (determined by an <element> definition) in the XML schema.

In step 604, the determination unit (211) records a name used to determine the selected <element> definition as the feature name of the selected <element> definition in the feature value table (231).

In step 605, when the selected <element> definition is a simple type element, the determination unit (211) records, in the feature value table (231), a name acquired by appending "/text( )" to the name determining the selected <element> definition as a feature name for a feature value representing the size of a text portion of the simple type element.

In step 606, the determination unit (211) checks whether any <element> definition the feature name of which has not been recorded in the feature value table (231) exists on the XML schema read into the memory. When an <element> definition the feature name of which has not been recorded exists, the process proceeds to step 607. On the other hand, when any <element> definition the feature name of which has not been recorded does not exist, the process proceeds to step 608.

In step 607, the determination unit (211) selects the first <element> definition the feature name of which has not been recorded. After the selection, the process returns to step 604 where the determination unit (211) records, in the feature value table (231), a name determining the first <element> definition, the feature name of which has not been recorded, as the feature name of the <element> definition.

In step 608, the determination unit (211) terminates the algorithm for listing feature names. The process proceeds to step 701 of an algorithm in a flowchart shown in FIG. 7 to generate rules.

Figure 7:
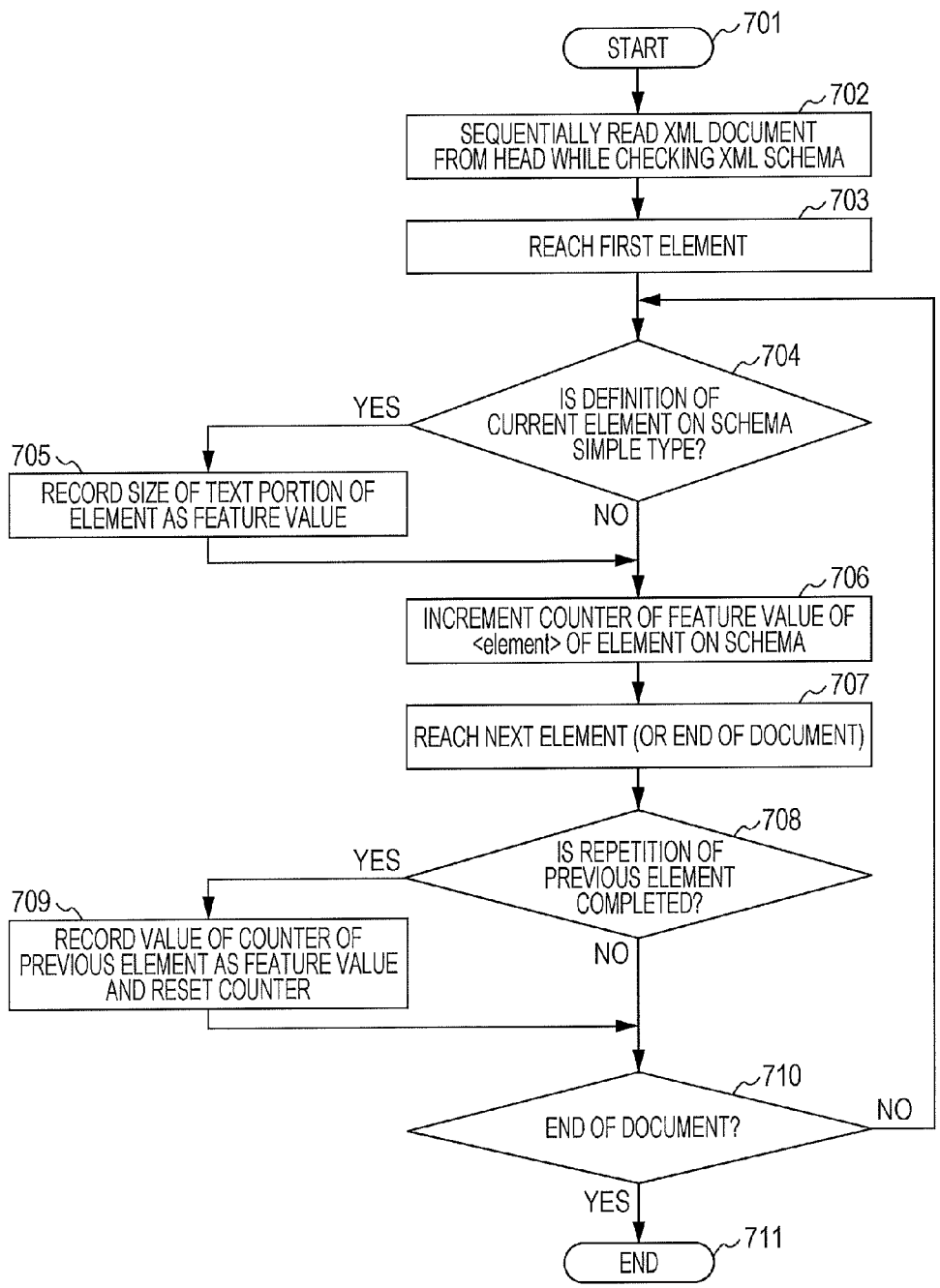
FIG. 7 shows a flowchart of a process according to an embodiment of the present invention of acquiring the number of repetitions of an <element> definition in an XML schema as a feature value and acquiring the number of bytes of a simple type definition as a feature value for each XML document.

FIG. 7 shows a flowchart of a process according to the embodiment of the present invention of acquiring the number of repetitions of an <element> definition in an XML schema as a feature value and acquiring the number of bytes of a simple type definition as a feature value for each XML document.

In step 701, the acquisition unit (212) starts an algorithm for acquiring feature values.

In step 702, the acquisition unit (212) loads a target XML schema (for example, the schema (301) in FIG. 3) from the XML schema storage unit (221) into the memory and reads the content of an XML document loaded from the XML document storage unit (222) from the head while checking the XML schema.

In step 703, when a reading operation reaches the first element in the XML document, the acquisition unit (212) causes the process to proceed to step 704.

In step 704, the acquisition unit (212) checks whether the definition of the element reached in step 703 on the XML schema is a simple type or another type. When the element is a simple type element, the process proceeds to step 705. On the other hand, when the element is not a simple type element, the process proceeds to step 706.

In step 705, the acquisition unit (212) records the size of a text portion of the simple type element or the average of the sizes in the feature value table (231). Since one <element> definition on an XML schema may correspond to a plurality of portions of an XML document, the feature value may be recorded a plurality of times. Thus, when a feature value is recorded, the number of times recording has been performed may be recorded at the same time. Then, when recording is performed for the second and subsequent times, the feature value may be overwritten by the average up to the point to be recorded. When the recording is completed, the process proceeds to step 706.

In step 706, when the process has proceeded from step 704, the acquisition unit (212) increments the counter of the feature value of the <element> definition of the non-simple type element on the schema. When the process has proceeded from step 705 to step 706, the acquisition unit (212) increments the counter of the feature value of the <element> definition of the simple type element on the schema.

In step 707, when the next element in the XML document is reached, the acquisition unit (212) causes the process to proceed to step 708. Moreover, when the end of the XML document is reached, the acquisition unit (212) causes the process to proceed to step 708. Completion of repetition of the element can be determined by (1) occurrence of another element or (2) occurrence of an end tag of a parent element. In step 707, "the next element is reached" is stated, assuming that the conditions (1) and (2) can be checked at the same time. This means that, for example, the XML document is read in forward before a start tag of each of <C> (second line), <D> (third line), <D> (fourth line), <D> (fifth line), <C> (seventh line), <D> (eighth line), <D> (ninth line), <D> (tenth line), <C> (twelfth line), <D> (thirteenth line), <D> (fourteenth line), <D> (fifteenth line), and <A> (seventeenth line) shown in FIG. 4A is reached.

In step 708, the acquisition unit (212) determines whether repetition of the previous element is completed. When the repetition is completed, the process proceeds to step 709. On the other hand, when the repetition is not completed, the process proceeds to step 710.

In step 709, the acquisition unit (212) records the value of the counter of the previous element as a feature value and resets the counter. Then, the process proceeds to step 710.

In step 710, the acquisition unit (212) determines whether the end of the XML document is reached. When the end of the document is reached before the next element is reached, the counter of the number of repetitions is recorded, and the process proceeds to step 711. On the other hand, when the end of the document is not reached, the process returns to step 704, and steps 704 to 710 are repeated for the next element.

In step 711, the acquisition unit (212) terminates the algorithm for acquiring feature values. The process starts an algorithm in a flowchart shown in FIG. 8 so as to generate rules.

Figure 8:
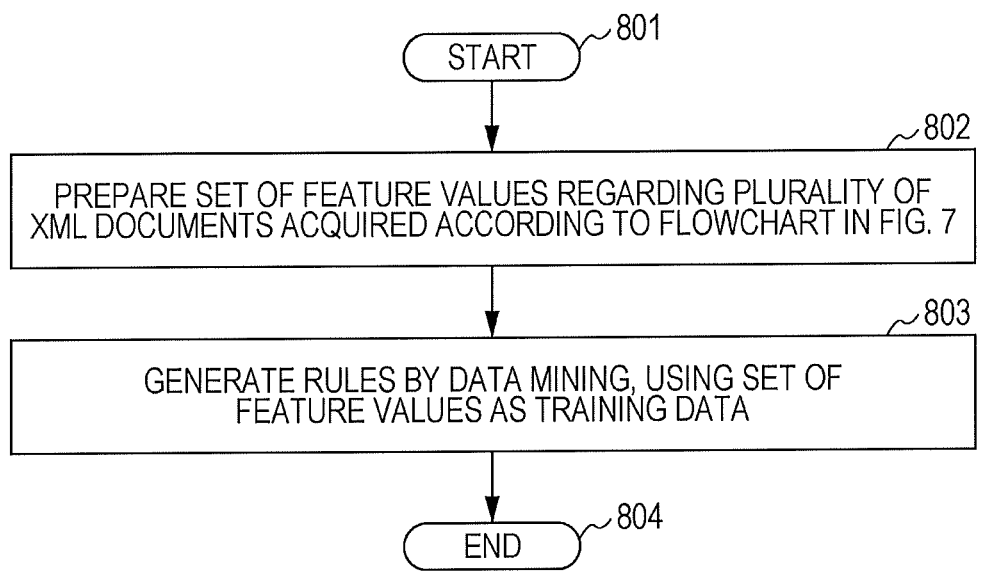
FIG. 8 shows a flowchart of a process according to an embodiment of the present invention of generating rules from the feature values acquired in FIG. 7 by applying a data mining method.

FIG. 8 shows a flowchart of a process according to the embodiment of the present invention of generating rules from the feature values acquired in FIG. 7 by applying a data mining method.

In step 801, the rule generation unit (213) starts an algorithm for generating rules.

In step 802, the rule generation unit (213) prepares a set of feature values regarding a plurality of XML documents acquired according to the flowchart in FIG. 7. The set of feature values may be prepared as, for example, the feature value table (231).

In step 803, the rule generation unit (213) generates rules by data mining, using the set of feature values as training data. The rule generation unit (213) stores the generated rules in the rule storage unit (223).

In step 804, the rule generation unit (213) terminates the algorithm for generating rules.

Figure 9:
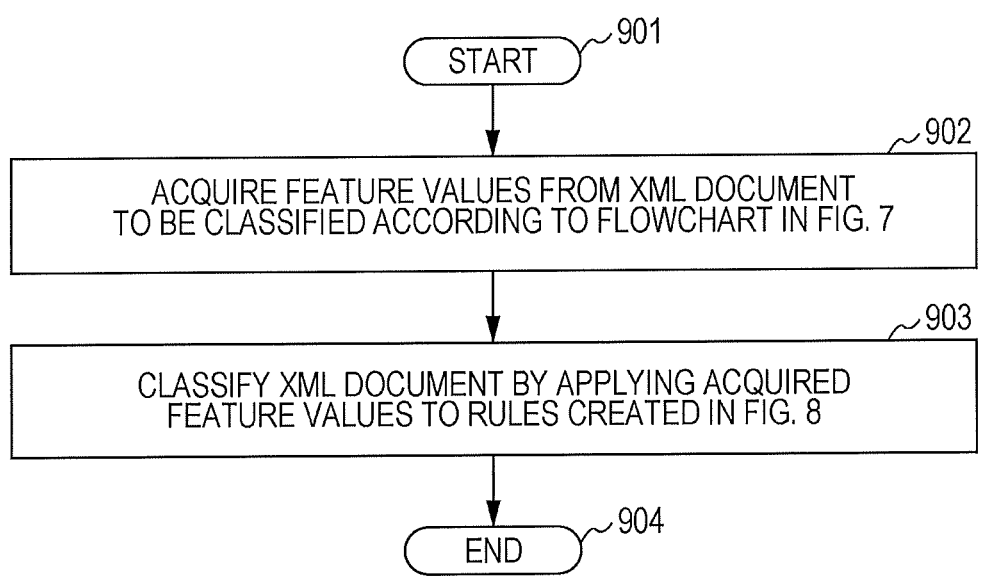
FIG. 9 shows a flowchart of a process according to an embodiment of the present invention of classifying an XML document using the rules generated in FIG. 8.

FIG. 9 shows a flowchart of a process according to the embodiment of the present invention of classifying an XML document using the rules generated in FIG. 8.

In step 901, the classification unit (241) starts an algorithm for classifying an XML document.

In step 902, the acquisition unit (212) acquires, from an XML document to be classified, the respective feature values of elements in the XML document according to the flowchart shown in FIG. 7. The acquisition unit (212) associates the XML document, from which the feature values are acquired, with the acquired feature values.

In step 903, the classification unit (241) loads the rules from the rule storage unit (223) into the memory and classifies the XML document including the acquired feature values according to the rules by applying the acquired feature values to the rules.

In step 904, the classification unit (241) terminates the algorithm for classifying an XML document.

Figure 10:
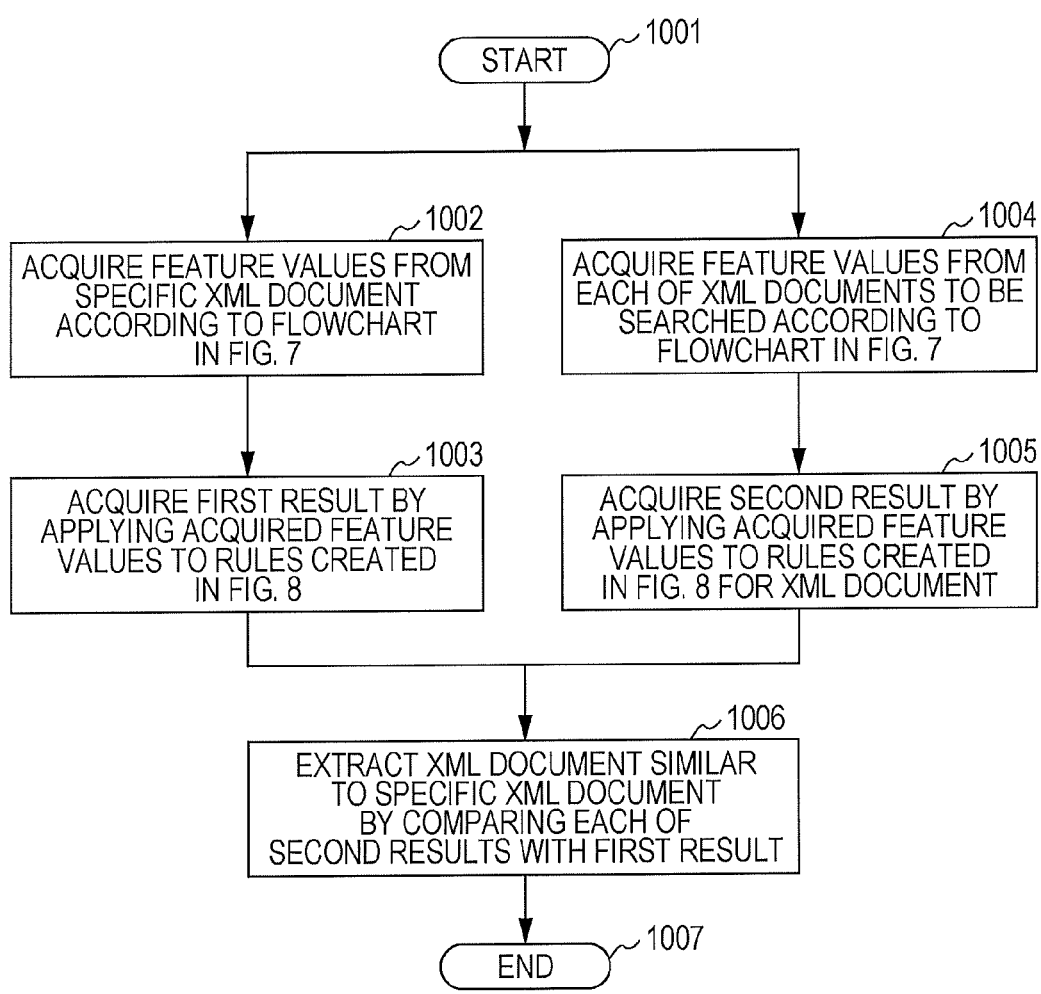
FIG. 10 shows a flowchart of a process according to an embodiment of the present invention of extracting an XML document similar to a specific XML document from XML documents to be searched, using the rules generated in FIG. 8.

FIG. 10 shows a flowchart of a process according to the embodiment of the present invention of extracting an XML document similar to a specific XML document from XML documents to be searched, using the rules generated in FIG. 8.

In step 1001, the retrieval unit (242) starts an algorithm for extracting an XML document similar to a specific XML document.

In step 1002, the acquisition unit (212) acquires, from a specific XML document, the respective feature values of elements in the XML document according to the flowchart in FIG. 7. The acquisition unit (212) associates the XML document, from which the feature values are acquired, with the acquired feature values.

In step 1003, the retrieval unit (242) loads the rules from the rule storage unit (223) into the memory and acquires a first result by applying the feature values acquired in step 1002 to the rules.

In step 1004, the acquisition unit (212) acquires, from each of a plurality of XML documents to be searched, the respective feature values of elements in the XML document according to the flowchart in FIG. 7. The acquisition unit (212) associates the XML document, from which the feature values are acquired, with the acquired feature values.

In step 1005, the retrieval unit (242) loads the rules from the rule storage unit (223) into the memory and acquires a second result by applying the feature values acquired in step 1004 to the rules for the XML document.

In step 1006, the retrieval unit (242) extracts a structured document similar to the specific structured document by comparing each of the second results from step 1005 with the first result from step 1003. A structured document similar to the specific structured document is retrieved by this extraction.

In step 1007, the retrieval unit (242) terminates the algorithm for extracting an XML document similar to a specific XML document.

Figure 11:
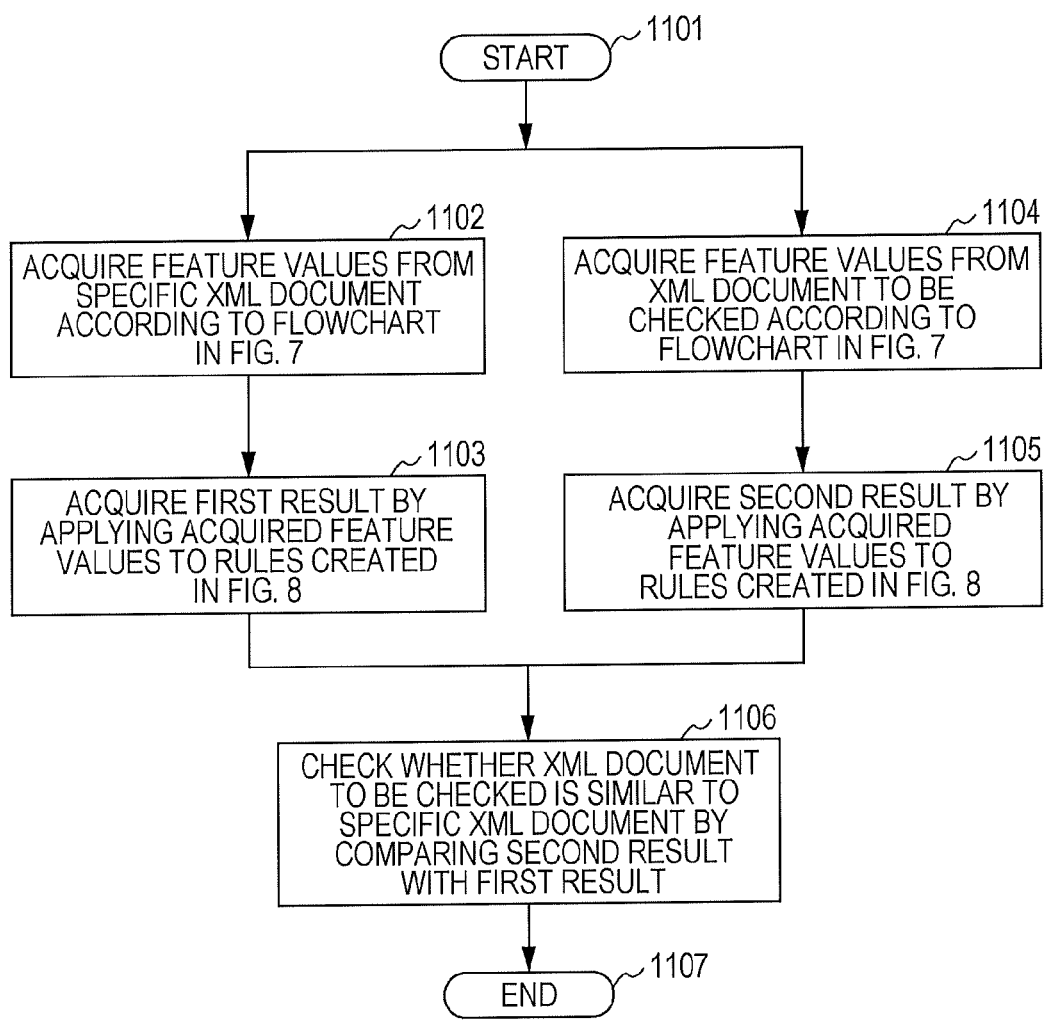
FIG. 11 shows a flowchart of a process according to an embodiment of the present invention of checking whether an XML document to be checked is similar to a specific XML document, using the rules generated in FIG. 8.

FIG. 11 shows a flowchart of a process according to the embodiment of the present invention of checking whether an XML document to be checked is similar to a specific XML document, using the rules generated in FIG. 8.

In step 1101, the check unit (243) starts an algorithm for checking whether an XML document to be checked is similar to a specific XML document.

In step 1102, the acquisition unit (212) acquires, from a specific XML document, the respective feature values of elements in the XML document according to the flowchart in FIG. 7. The acquisition unit (212) associates the XML document, from which the feature values are acquired, with the acquired feature values.

In step 1103, the check unit (243) loads the rules from the rule storage unit (223) into the memory and acquires a first result by applying the feature values acquired in step 1102 to the rules.

In step 1104, the acquisition unit (212) acquires, from an XML document to be checked, the respective feature values of elements in the XML document according to the flowchart in FIG. 7. The acquisition unit (212) associates the XML document, from which the feature values are acquired, with the acquired feature values.

In step 1105, the check unit (243) loads the rules from the rule storage unit (223) into the memory and acquires a second result by applying the feature values acquired in step 1104 to the rules.

In step 1106, the check unit (243) checks whether the structured document to be checked is similar to the specific structured document by comparing the second result from step 1105 with the first result from step 1103. Whether the structured document to be checked is similar to the specific structured document may be determined by checking whether the second result and the first result are the same as or similar to each other in, for example, a predetermined proportion (for example, 80% or more). The predetermined proportion may be freely set in a manner that depends on how much a document is similar.

In step 1107, the check unit (243) terminates the algorithm for checking whether an XML document to be checked is similar to a specific XML document.

Figure 12:
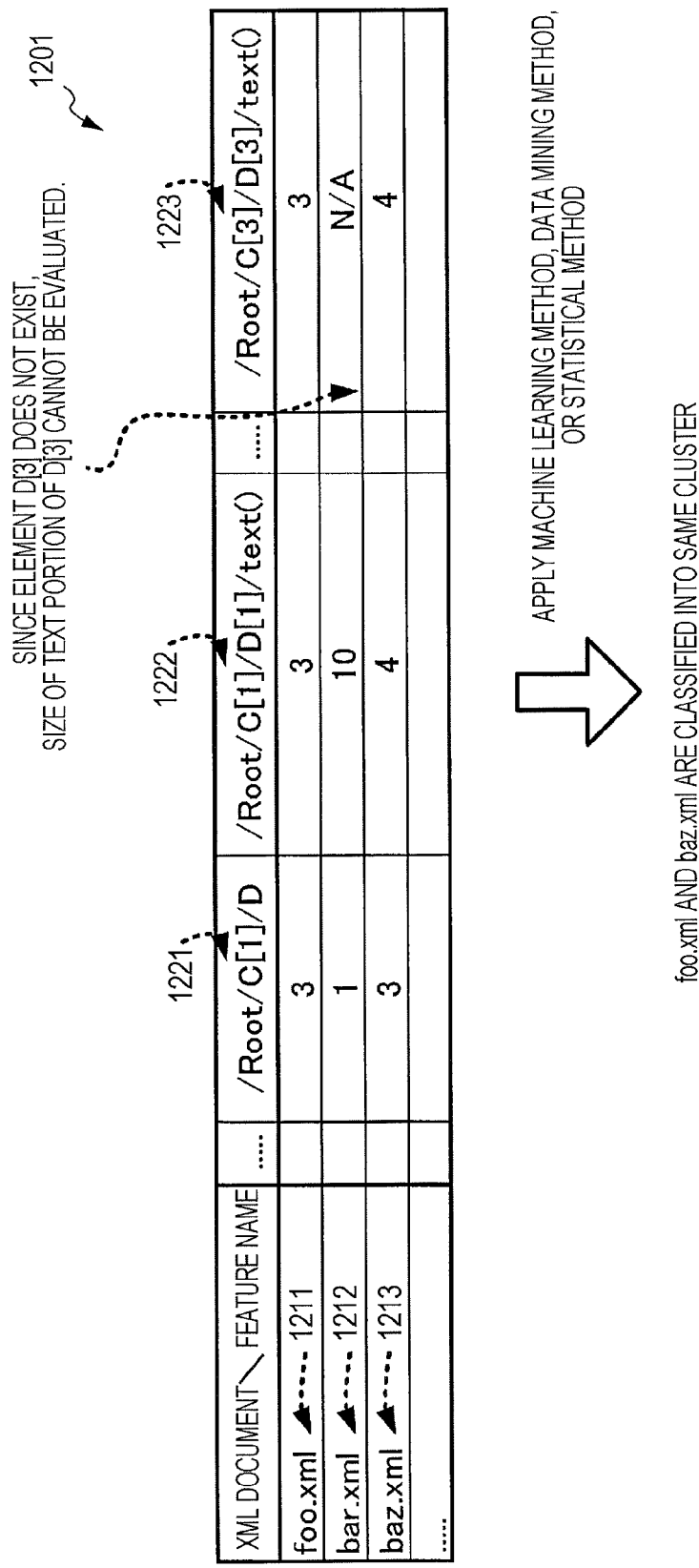
FIG. 12 is a table according to an embodiment of the present invention showing feature values for XPath expressions used to classify the XML code shown in FIG. 3 and other XML code.

FIG. 12 is a table according to the embodiment of the present invention showing feature values for XPath expressions used to classify the XML code shown in FIG. 3 and other XML code.

In the flowchart in FIG. 6 for listing feature names, in the case of the schema shown in FIG. 3, the number of repetitions regarding a definition such as an <xs:element> tag or an <xs:complex> tag on the XML schema is used as a feature value. In addition to these definitions, a feature value regarding an absolute location path (for example, XPath) expression uniquely determining a node may be used. Classification can be performed more correctly by using an absolute location path than by using <element> definition. An absolute location path is an expression in which only numeric comparison of child axes and position( ) is used. The characteristics of an absolute location path are as follows: (1) one node is always selected (in other words, a plurality of nodes are not selected); (2) an expression indicating a node is uniquely determined, and (3) position( ) is not specified for the last node (so that the number of repetitions is specified). An exemplary absolute location path may be expressed by "/child::Root/child::C[position( )=1]/child::D[position( )=1]/text( )". This expression may be expressed in a shortened form, "/Root/C[1]/D[1]/text( )". For an element occurring repeatedly, classification in a case where the tendency of each subtree varies with the location can be performed by using an absolute location path. Moreover, in a case where a definition on an XML schema is used recursively, elements that correspond to the same definition but the respective locations of which on an actual XML document are different (the respective absolute location paths are different) can be distinguished from each other.

A feature value table (1201) in FIG. 12 shows correspondences between XML documents and feature names and the feature value of each of the feature names for each of the XML documents. XPath expressions are used as feature names: /Root/C[1]/D, /Root/C[1]/D[1]/text( ) and /Root/C[3]/D[3]/text( ) In this case, position( ) is not specified for the last node in an XML document, as described above. Moreover, a name in which "/text( )" is appended to the end of an absolute location path is recorded in the feature value table (231) as a feature name for a feature value indicating the size of a text portion.

The feature value table (1201) in FIG. 12 includes feature names (1221 to 1223) and feature values regarding XML documents (foo.xml, bar.xml, and baz.xml) (1211 to 1213).

In the feature value table (1201) in FIG. 12, an XPath expression is used as a feature name for a feature value that is the number of repetitions of an element. Thus, in the case of the structured documents shown in FIG. 12, the XPath expressions /Root/C[1]/D (hereinafter called the expression 1), /Root/C[1]/D[1]/text( )(hereinafter called the expression 2), and /Root/C[3]/D[3]/text( )(hereinafter called the expression 3) are used as feature names. In this case, "/text( )" is appended to the end of a feature name for a feature value indicating the size of a text portion, as described above.

Feature values corresponding to the feature names, the expression 1 (1221), the expression 2 (1222), and the expression 3(1223) of foo.xml (1211), are 3, 3, and 3, respectively.

Feature values corresponding to the aforementioned feature names of bar.xml (1212) (the code is not shown) are 1, 10, and N/A, respectively. In bar.xml (1212), since an element D[3] does not exist, the size of a text portion of the element D[3] cannot be evaluated.

Feature values corresponding to the aforementioned feature names of baz.xml (1213) (the code is not shown) are 3, 4, and 4, respectively.

The feature value table (1201) is stored in the feature value table (231).

The rule generation unit (213) may read the feature value table (1201) from the feature value table (231) into the memory and apply a machine learning method regarding each feature name and corresponding feature values. Then, rules regarding a schema are generated. The rules are stored in the rule storage unit (223).

In the example in FIG. 12, the rule generation unit (213) generates rules using all the feature values of foo.xml (1211), bar.xml (1212), and baz.xml (1213). The generated rules are for classifying a cluster for foo.xml (1211) and baz.xml (1213) and a cluster for bar.xml (1212). In the case of this example, while rules are generated, the classification unit (241) may classify foo.xml (1211), bar.xml (1212), and baz.xml (1213) that are input data. The classification unit (241) classifies foo.xml (1211) and baz.xml (1213) into the same cluster. In this case, when classifying an XML document other than foo.xml (1211), bar.xml (1212), and baz.xml (1213) according to the generated rules, the classification unit (241) reads the rules stored in the rule storage unit (223) and performs classification. That is, it should be noted that generation of rules and classification of a structured document are not performed at the same time.

Figure 13:
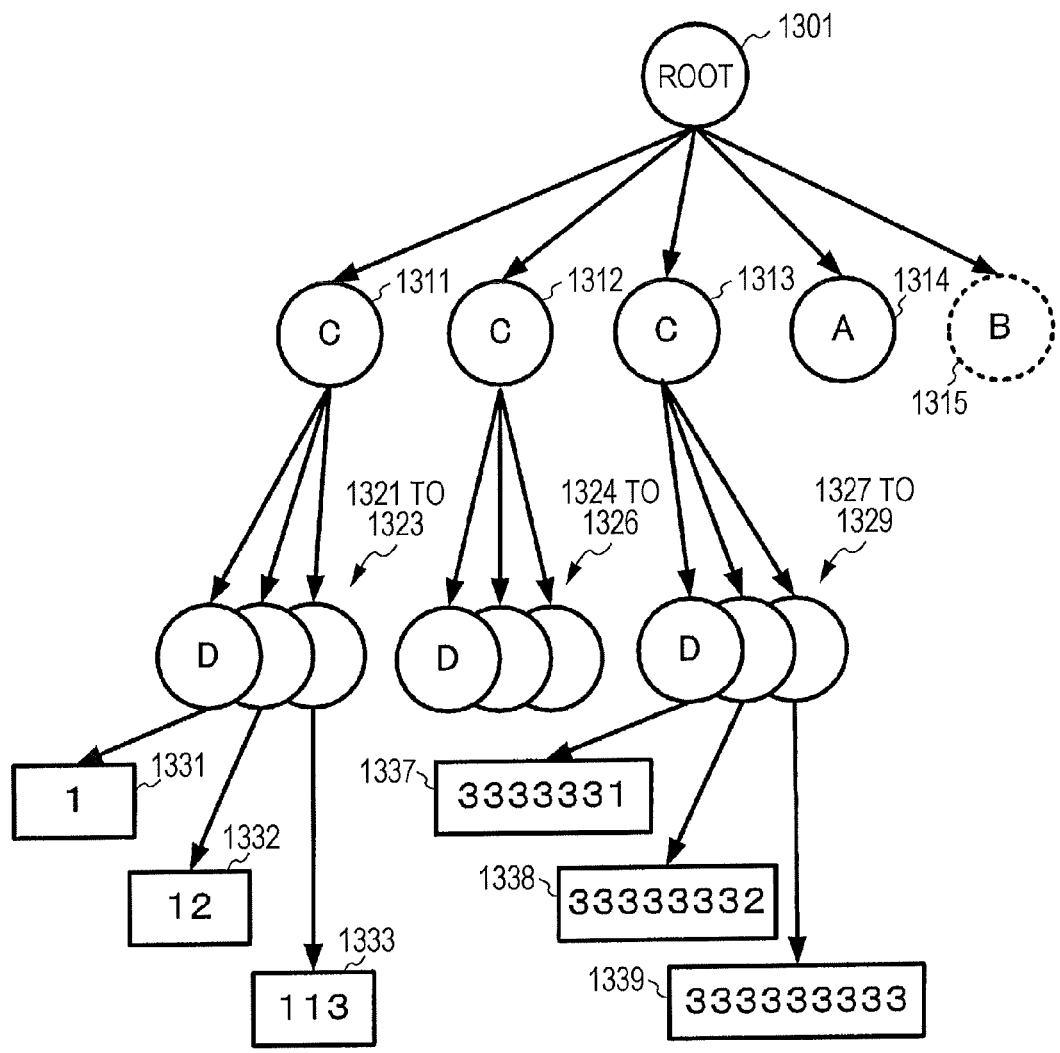
FIG. 13 shows that the use of the XPath expressions shown in FIG. 12 enables distinction between nodes that have the same child node name and are located under different parent nodes having the same parent node name according to an embodiment of the present invention.
Figure 14:
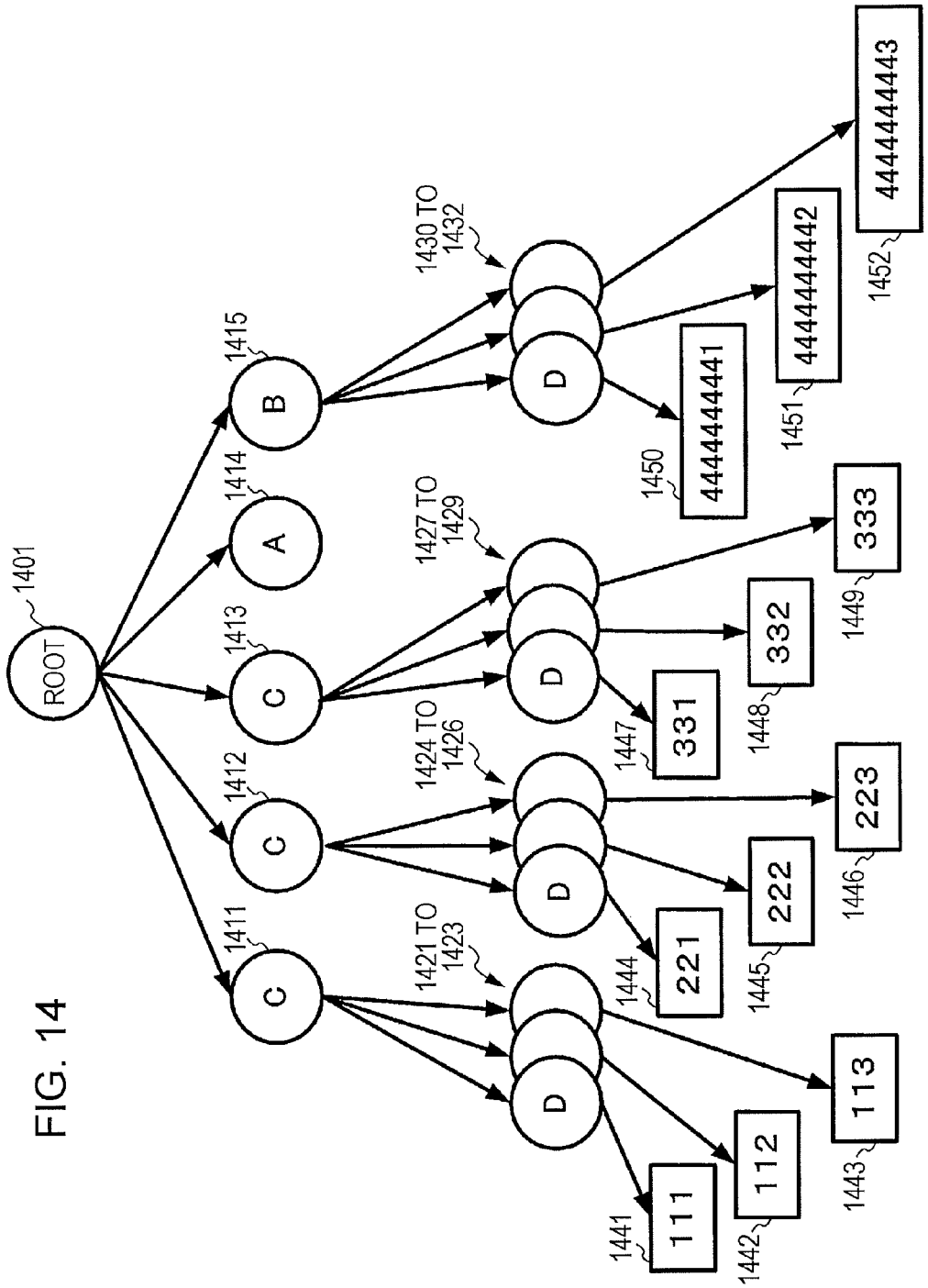
FIG. 14 shows that the use of the XPath expressions shown in FIG. 12 enables distinction between nodes that have the same child node name and are located under different parent nodes having respective different parent node names according to an embodiment of the present invention.

In FIGS. 13 and 14, specific examples in which the XPath expressions shown in FIG. 12 are used will be described.

FIG. 13 shows that the use of the XPath expressions shown in FIG. 12 enables distinction between nodes that have the same child node name and are located under different parent nodes having the same parent node name according to the embodiment of the present invention.

Since the figure is "1", the text size (1331) (feature value) of a child node (1321) is one. Since the figure is "12" (1332), the text size (feature value) of a child node (1322) is two. Since the figure is "113" (1333), the text size (feature value) of a child node (1323) is three. Since the figure is "3333331" (1337), the text size (feature value) of a child node (1327) is seven. Since the figure is "33333332" (1338), the text size (feature value) of a child node (1328) is eight. Since the figure is "333333333" (1339), the text size of a child node (1329) is "9" (feature value). Thus, the feature value of a child node D is (1+2+3+7+8+9)/6=5 that is the average of the aforementioned six feature values.

For example, two child nodes (for example, 1321 and 1329) are defined as the same child node D on an XML schema and thus are not distinguished from each other. On the other hand, the two child nodes (1321 and 1329) can be distinguished from each other, using XPath expressions. That is, while the child node (1321) is expressed by an XPath expression "/Root/C[1]/D[1]/text( )", the child node (1329) is expressed by an XPath expression "/Root/C[3]/D[3]/text( )". Thus, the nodes can be distinguished from each other. Thus, rules can generated, and a structured document can be classified, detected, and checked, using the feature value "1" that is the text size of the child node D (1321) and the feature value "9" that is the text size of the child node D (1329).

FIG. 14 shows that the use of the XPath expressions shown in FIG. 12 enables distinction between nodes that have the same child node name and are located under different parent nodes having respective different parent node names according to the embodiment of the present invention.

In FIG. 13, the child nodes D (1321 to 1323, 1324 to 1326, and 1327 to 1329) are referred to from the corresponding parent nodes C (1311, 1312, and 1313), i.e., are referred to from parent nodes having the same name C. On the other hand, in FIG. 14, child nodes D can be referred to from not only nodes C (1411, 1412, and 1413) but also a node B (1415) having a name different from the nodes C, as shown in FIG. 14.

In FIG. 14, the size of each of respective texts (1441 to 1449) of the child nodes D (1421 to 1423, 1424 to 1426, and 1427 to 1429) referred to from the corresponding parent nodes C (1411, 1412, and 1413) is "3". On the other hand, the size of each of respective texts (1450 to 1452) of the child nodes D (1430 to 1432) referred to from the parent node B (1415) is "10". When no XPath expression is used, the three groups of child nodes D (1421 to 1423, 1424 to 1426, and 1427 to 1429) are not distinguished from the child nodes D (1430 to 1432) as different child nodes on an XML schema. On the other hand, the three groups of child nodes D (1421 to 1423, 1424 to 1426, and 1427 to 1429) can be distinguished from the child nodes D (1430 to 1432) as different child nodes, using XPath expressions.

For example, when C is "address", B is "person", and D is "name", since each of the child nodes D (1421 to 1423, 1424 to 1426, and 1427 to 1429) is "name under address", and each of the child nodes D (1430 to 1432) is "name under person", the groups of nodes D can be distinguished from each other. Thus, the rule generation unit (213) generates rules using the feature value "3" (average) of the child nodes D (1421 to 1429) and the feature value "10" (average) of the child nodes D (1430 to 1432). Then, a structured document can be classified, detected, and checked using the generated rules.

Figure 15:
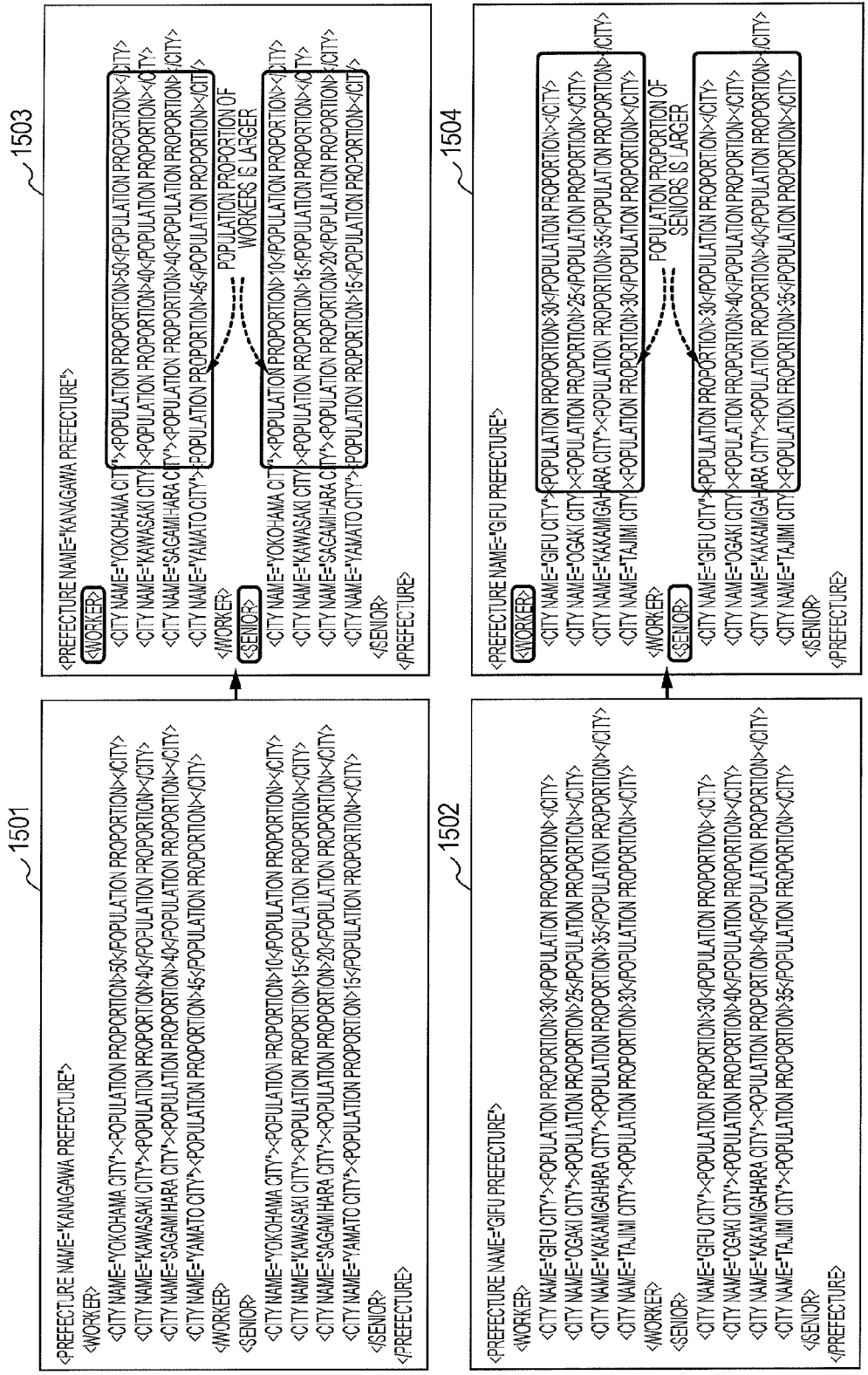
FIG. 15 is XML documents for illustrating a specific example in which XML documents are extracted from the feature values acquired in FIG. 3 according to an embodiment of the present invention.

FIG. 15 is XML documents for illustrating a specific example in which XML documents are extracted from the feature values acquired in FIG. 3 according to the embodiment of the present invention.

In FIG. 15, a schema for storing information on the population of a prefecture described below will be considered.

Element Definition
    prefecture: the attribute is a prefecture name
    city: the attribute is a city name
    worker: an element for compiling information on workers
    senior: an element for compiling information on seniors
    population proportion: the value is an integer
Structure
    One "prefecture" exists in a document
    Elements "worker" and "senior" are child elements of "prefecture"
    Any number of "city" may exist as child elements of "population classification"
    One "population proportion" always exists as a child element of "city"

The following two are the same element "population proportion" but have difference characteristics. Thus, for classification, it is more convenient that the two can be handled separately.

"worker/city/population proportion"
    "senior/city/population proportion"

An XML document (1501) in FIG. 15 defines the respective population proportions of workers and seniors in each city in Kanagawa prefecture. Moreover, an XML document (1502) defines the respective population proportions of workers and seniors in each city in Gifu prefecture. In such a case, a prefecture in which the respective proportions of seniors and workers are different can be classified by handling "worker/city/population proportion" and "senior/city/population proportion" separately using the XPath expressions. On the other hand, when no XPath expression is used, and "worker/city/population proportion" and "senior/city/population proportion" are not handled separately, since the figures (feature values) are averaged, classification described below cannot be performed.

An XML document (1503) is the same as the XML document (1501). It can be found that the population proportion of workers is larger than that of seniors in each city, as marked in the XML document (1503). Similarly, an XML document (1504) is the same as the XML document (1502). It can be found that the population proportion of seniors is larger than that of workers in each city, as marked in the XML document (1504).

FIG. 16 is an XML schema according to the embodiment of the present invention for the XML documents in FIG. 15. In a schema (1601), a figure at the left of each line (first to nineteenth lines) is assigned for convenience of explanation.

FIG. 17 illustrates an exemplary automaton according to the embodiment of the present invention used to determine to which cluster an XML document is close from the beginning of the XML document using the rules generated according to the flowchart described in FIG. 8.

An automaton for each tag regarding one or more typical documents in each cluster is first created, as shown in FIG. 17. Then, each of selected XML documents foo.xml and bar.xml is checked from the head, and an automaton in which a branch occurs when different portions occur is created. A creation method disclosed in Japanese Unexamined Patent Application Publication No. 2006-24179 filed by the applicant may be used as a method for creating an automaton (in particular, refer to FIGS. 32 and 33).

FIG. 17 shows that there are three clusters, a cluster 1 (1711), a cluster 2 (1712), and a cluster 3 (1713), and the aforementioned different portions are nodes (1701 and 1703). The explanation will be given, taking the example in FIG. 5 or 12. For example, the computer selects, as typical documents, foo.xml from a cluster for foo.xml and baz.xml and bar.xml from a cluster for bar.xml. Any selection method is used. However, the simplest selection method is, for example, simply selecting the first XML document. Then, when a cluster is determined, the determination is terminated.

When a plurality of clusters exist, in which the respective large ranges of first halves of XML documents are the same, the computer needs to read the large ranges for the determination. Thus, it is better to compile such a plurality of clusters into a single cluster. Moreover, when no path matching an automaton exists as well, a document may be classified into the most approximate cluster. The simplest method for classifying a document into the most approximate cluster is classifying a document into the most probable cluster (i.e., having the largest number of instances). Classifying a document into the most approximate cluster can accommodate documents in which only the respective numbers of repetitions or text portions are different. Moreover, when a matching path significantly differs as well, it is better to classify a document into the most probable cluster (i.e., having the largest number of instances).

Figure 18:
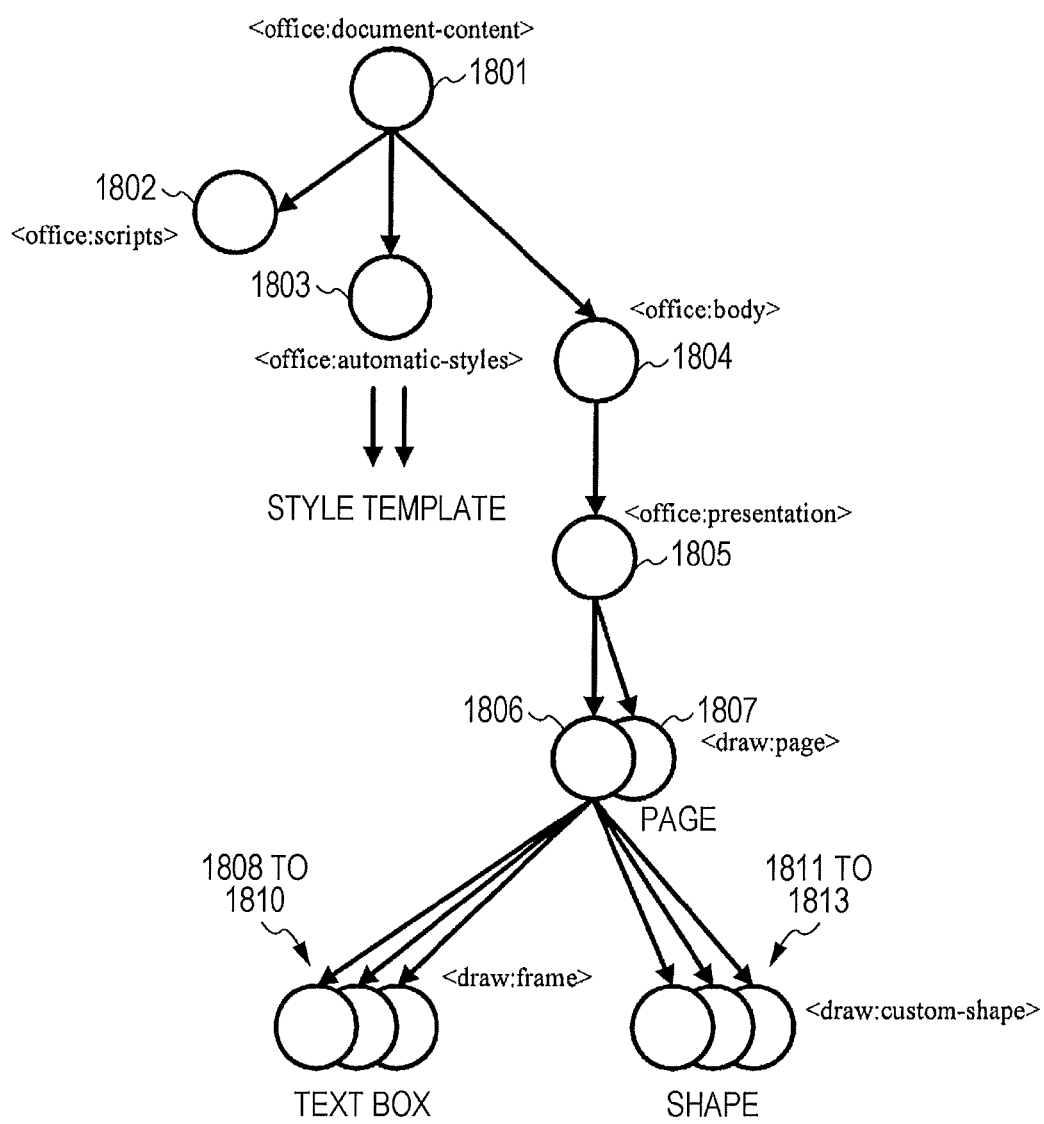
FIG. 18 illustrates an exemplary ODF document according to an embodiment of the present invention used to detect or check a similar document for DLP using the rules generated according to the flowchart described in FIG. 8.

FIG. 18 illustrates an exemplary ODF document according to the embodiment of the present invention used to detect or check a similar document for DLP using the rules generated according to the flowchart described in FIG. 8.

FIG. 18 expresses, as an ODF document, an XML document (for example, an XML document created in an office application) to be prevented from being leaked externally, for example, a confidential document, by a tree structure. The tree structure is composed of a root (1801) and child nodes (1802 to 1813). The child nodes (1802 to 1813) include, for example, a style template (1803), text boxes (1808 to 1810), and shapes (1811 to 1813).

The check unit (243) may detect a document similar to an ODF document from new XML documents to be checked by applying the rules to the new XML documents. Thus, when information to be prevented from being leaked externally is specified in the ODF document, an XML document similar to the ODF document can be retrieved, and the XML document similar to the ODF document can be prevented from being leaked via, for example, mail transmission in advance. In detection of a similar document for DLP, a similar document for DLP can be detected or checked from various viewpoints by performing calculation of the similarities between a predetermined new XML document and a plurality of ODF documents at the same time instead of one-for-one calculation of the similarity between an ODF document and a new XML document.

Moreover, in detection of a similar document for DLP, a numeric value indicating how much an XML document is similar to an ODF document can be also calculated.

Since the process of extracting an XML document similar to a specific XML document from XML documents to be searched and the process of checking whether an XML document to be checked is similar to a specific XML document are shown in the respective flowcharts in FIGS. 10 and 11, refer to the flowcharts.

Figure 19:
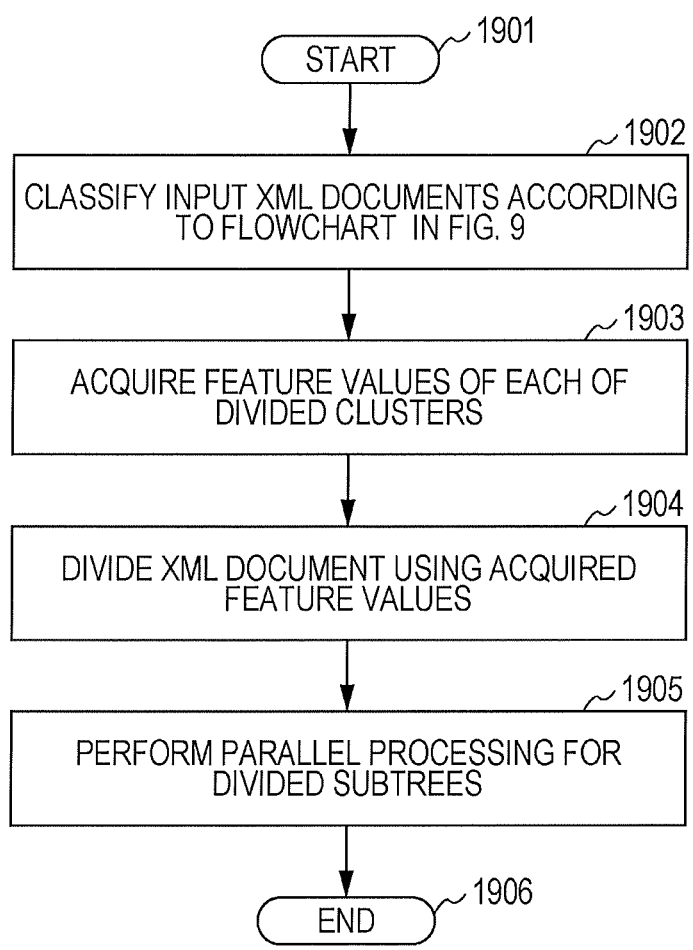
FIG. 19 is a flowchart of a process according to an embodiment of the present invention of classifying XML documents into clusters in advance according to the flowchart described in FIG. 9, predicting a dividing method for each of the clusters, and then dividing an XML document.

FIG. 19 is a flowchart of a process according to the embodiment of the present invention of classifying XML documents into clusters in advance according to the flowchart described in FIG. 9, predicting a dividing method for each of the clusters, and then dividing an XML document.

By dividing a syntax tree corresponding to an XML document, the divided subtrees can be processed by a multi-core processor in parallel. By classifying XML documents in advance according to the flowchart described in FIG. 9 before performing the division, even when an XML document or a group of XML documents with a significantly different structure exist in a plurality of XML documents belonging to the same schema, a syntax tree can be efficiently divided, and furthermore, high-speed processing can be implemented via a multiprocessor.

A specific process will next be described according to the flowchart shown in FIG. 19.

In step 1901, the computer starts dividing a syntax tree and parallel processing of divided subtrees.

In step 1902, for example, the computer classifies a set of a certain number of XML documents belonging to a schema into clusters by batch processing in advance according to the flowchart described in FIG. 9.

In step 1903, the computer acquires feature values of each of the clusters acquired in step 1902 and stores the feature values in the memory. The computer predicts an appropriate dividing method for the cluster in advance on the basis of the acquired feature values.

In step 1904, when processing a new XML document, the computer classifies the XML document by determining an approximate cluster from the beginning of the XML document and divides the XML document according to the dividing method predicted in advance. A dividing method disclosed in Japanese Patent Application No. 2010-14356 (reference no. JP100028A) filed by the applicant may be used as a method for dividing a syntax tree corresponding to an XML document. The content of Japanese Patent Application No. 2010-14356 is incorporated into the description by reference and constitutes a part of the description.

In step 1905, the computer performs parallel processing for divided subtrees by a multiprocessor.

In step 1906, the computer terminates dividing a syntax tree and parallel processing of divided subtrees.

As will be appreciated by one skilled in the art, aspects of the present invention may be embodied as a system, apparatus, method or computer program product. Accordingly, aspects of the present invention may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, aspects of the present invention may take the form of a computer program product embodied in one or more computer readable medium(s) having computer readable program code embodied thereon.

Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device.

A computer readable signal medium may include a propagated data signal with computer readable program code embodied therein, for example, in baseband or as part of a carrier wave. Such a propagated signal may take any of a variety of forms, including, but not limited to, electro-magnetic, optical, or any suitable combination thereof. A computer readable signal medium may be any computer readable medium that is not a computer readable storage medium and that can communicate, propagate, or transport a program for use by or in connection with an instruction execution system, apparatus, or device.

Program code embodied on a computer readable medium may be transmitted using any appropriate medium, including but not limited to wireless, wireline, optical fiber cable, RF, etc., or any suitable combination of the foregoing.

Computer program code for carrying out operations for aspects of the present invention may be written in any combination of one or more programming languages, including an object oriented programming language such as Java, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the present invention are described herein with reference to flowchart illustrations and/or block diagrams of methods, apparatus (systems) and computer program products according to embodiments of the invention. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks.

The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks.

Referring again to FIGS. 1 through 20, the diagrams in the Figures illustrate the architecture, functionality, and operation of possible implementations of systems, methods and computer program products according to various embodiments of the present invention. In this regard, each block in a flowchart or a block diagram may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagram and/or flowchart illustration, and combinations of blocks in the block diagram and/or flowchart illustration, can be implemented by special purpose hardware-based systems that perform the specified functions or acts, or combinations of special purpose hardware and computer instructions.

The terms as used herein are only for illustrating specific embodiments, but not intended to limit this invention. The phrase "a" and "the" in singular form herein is intended also to include a plural form, unless otherwise specified in the context. It should be further noted that when the word "comprising" is used in this specification, it indicates existence of a feature, unity, step, operation, unit and/or component as set forth, but it does not exclude existent or addition of one or more other features, unities, steps, operations, units and/or components, and/or their combination.

It will be appreciated and should be understood that the exemplary embodiments of the invention described above can be implemented in a number of different fashions. Given the teachings of the invention provided herein, one of ordinary skill in the related art will be able to contemplate other implementations of the invention. Indeed, although illustrative embodiments of the present invention have been described herein with reference to the accompanying drawings, it is to be understood that the invention is not limited to those precise embodiments, and that various other changes and modifications may be made by one skilled in the art without departing from the scope or spirit of the invention.

What is claimed is:

1. A method for generating rules for classifying a plurality of electronic structured documents to which a same schema is applied, the method comprising a computer performing steps of:
   determining one or more variable portions defined by the schema by scanning the schema;
   acquiring respective feature values of the determined variable portions from each of the plurality of structured documents and associating the structured document, from which the feature values are acquired, with the acquired feature values, wherein acquiring comprises reading content of the structured document while checking the schema; and
   generating the rules on the basis of the feature values associated with the structured document, wherein:
   the step of determining one or more variable portions includes the step of determining one or more elements included in a tree structure defined by the schema;
   the step of associating the structured document with the acquired feature values includes the step of acquiring respective feature values of the determined elements from each of the plurality of structured documents; and
   each of the feature values of the determined elements is a number of repetitions of an element included in the tree structure, except when an element is included in at least two nodes belonging to a same definition on the schema, each of the feature values of the determined elements is an average of respective numbers of repetitions of the element in the at least two nodes.

2. The method according to claim 1, wherein the step of determining one or more variable portions further includes the step of determining one or more attributes included in the tree structure defined by the schema, and
   the step of associating the structured document with the acquired feature values further includes the step of acquiring respective feature values of the determined attributes from each of the plurality of structured documents and associating the structured document, from which the feature values are acquired, with the acquired feature values.

3. The method according to claim 1, wherein each of the feature values of the determined elements further includes a size of a text portion of a simple type element included in the tree structure, a numeric value of a simple type element that is included in the tree structure and represents a numeric value, or a value associated with a selectable element included in the tree structure.

4. The method according to claim 1, wherein each of the feature values of the determined elements further includes an average of respective sizes of text portions of a simple type element included in at least two nodes belonging to a same definition on the schema, an average of respective numeric values of a simple type element representing a numeric value included in at least two nodes belonging to a same definition on the schema, or an average of respective values in association with a selectable element included in at least two nodes belonging to a same definition on the schema.

5. The method according to claim 2, wherein each of the feature values of the determined attributes is a value in association with presence or absence of an attribute included in the tree structure or a size of a text portion of an attribute included in the tree structure.

6. The method according to claim 1, further comprising the step of the computer associating at least one of the determined elements with an absolute path of the tree structure,
   wherein the step of associating the structured document with the acquired feature values further includes the step of acquiring respective feature values of the elements associated with the absolute path from each of the plurality of structured documents and associating the structured document, from which the feature values are acquired, with the acquired feature values.

7. The method according to claim 1, wherein the step of determining one or more elements includes the steps of:
   selecting a first element by scanning the schema; and
   assigning, to the selected first element, a name for determining the element as first feature name.

8. The method according to claim 7, wherein the step of associating the structured document with the acquired feature values further includes the step of associating the first feature name in the structured document with a feature value corresponding to the first feature name.

9. The method according to claim 7, wherein the step of determining one or more elements further includes the steps of:
- selecting an element by scanning the schema, a feature name of the element as a name for determining the element being not recorded, the element being a first element following the selected element, and
- assigning, as second feature name, a name for determining the element to the first element following the selected element.

10. The method according to claim 9, wherein the step of associating the structured document with the acquired feature values further includes the step of associating the second feature name in the structured document with a feature value corresponding to the second feature name.

11. The method according to claim 1, wherein the step of generating the rules includes the step of generating clustering rules on the basis of the feature values associated with the structured document using a machine learning method, a data mining method, or a statistical method.

12. The method according to claim 11, wherein the clustering rules are generated using cluster analysis, principal component analysis, vector quantization, a self-organizing map, reinforcement learning, unsupervised learning, the k-means method, or the expectation-maximization method.

13. The method according to claim 1, wherein the structured documents are in a format of a metalanguage: XML, HTML, XHTML, SGML, Open Document Format (ODF), or Office Open XML (OOXML).

14. The method according to claim 1, wherein the schema is in a format of a schema language: XML Schema, a document type definition (DTD), Regular Language description for XML (RELAX), RELAX Next Generation (RELAX NG), Name space-based Validation Dispatching Language (NVDL), or Schematron.

15. A method for classifying a plurality of electronic structured documents to which a same schema is applied, the method comprising a computer performing steps of:
- determining one or more variable portions defined by the schema by scanning the schema;
- acquiring respective feature values of the determined variable portions from a structured document to be classified, wherein acquiring comprises reading content of the structured document while checking the schema; and
- classifying the structured document including the acquired feature values by applying the acquired feature values to rules,
- wherein the rules are rules for determining, on the basis of the feature values of the variable portions of the structured document to be classified, to which set of clustered structured documents the structured document to be classified belongs, wherein:
- the step of determining one or more variable portions includes the step of determining one or more elements included in a tree structure defined by the schema;
- the method further includes the step of acquiring respective feature values of the determined elements from the structured document; and
- each of the feature values of the determined elements is a number of repetitions of an element included in the tree structure, except when an element is included in at least two nodes belonging to a same definition on the schema, each of the feature values of the determined elements is an average of respective numbers of repetitions of the element in the at least two nodes.

16. A method for retrieving a structured document similar to a specific structured document from a plurality of electronic structured documents to which a same schema is applied, the method comprising a computer performing steps of:
- determining one or more variable portions defined by the schema by scanning the schema;
- acquiring respective feature values of the determined variable portions from the specific structured document and acquiring a first result by applying the acquired feature values to rules, wherein acquiring comprises reading content of the specific structured document while checking the schema;
- acquiring respective feature values of the determined variable portions from each of the plurality of structured documents to be searched and acquiring a second result by applying the acquired feature values to the rules for the structured document; and
- extracting a structured document similar to the specific structured document by comparing, for the structured document, a corresponding one of the second results with the first result,
- wherein the rules are rules for determining, on the basis of the feature values of the variable portions of the specific structured document or the structured document to be searched, to which set of clustered structured documents the specific structured document or the structured document to be searched belongs,
- wherein the step of determining one or more variable portions includes the step of determining one or more elements included in a tree structure defined by the schema;
- wherein the method further includes the step of acquiring respective feature values of the determined elements from the specific structured document and from each of the plurality of structured documents to be searched; and
- wherein each of the feature values of the determined elements is a number of repetitions of an element included in the tree structure, except when an element is included in at least two nodes belonging to a same definition on the schema, each of the feature values of the determined elements is an average of respective numbers of repetitions of the element in the at least two nodes.

17. A method for checking whether electronic structured documents to which a same schema is applied are similar to a specific structured document, the method comprising a computer performing steps of:
- determining one or more variable portions defined by the schema by scanning the schema;
- acquiring respective feature values of the determined variable portions from the specific structured document and acquiring a first result by applying the acquired feature values to rules, wherein acquiring comprises reading content of the specific structured document while checking the schema;
- acquiring respective feature values of the determined variable portions from a structured document to be checked and acquiring a second result by applying the acquired feature values to the rules; and
- checking, by comparing the second result with the first result, whether the structured document to be checked is similar to the specific structured document,
- wherein the rules are rules for determining, on the basis of the feature values of the variable portions of the specific structured document or the structured document to be checked, to which set of clustered structured documents the specific structured document or the structured document to be checked belongs, wherein the step of determining one or more variable portions includes the step of determining one or more elements included in a tree structure defined by the schema;

wherein the method further includes the step of acquiring respective feature values of the determined elements from the specific structured document and the structured document to be checked; and wherein each of the feature values of the determined elements is a number of repetitions of an element included in the tree structure, except when an element is included in at least two nodes belonging to a same definition on the schema, each of the feature values of the determined elements is an average of respective numbers of repetitions of the element in the at least two nodes.

18. A computer program product comprising a computer readable storage medium comprising program code tangibly embodied thereon, which when executed by a computer performs the steps in the method according to claim 1.

19. A computer generating rules for classifying a plurality of electronic structured documents to which a same schema is applied, the computer comprising a memory and a processor connected to the memory and reading, into the memory, a program product for causing the processor to perform the steps in the method according to claim 1 to generate the rules.

20. The method according to claim 1, wherein reading the content of the structured document is performed sequentially from a head of the structured document.

* * * * *